(12) United States Patent
Seidelman et al.

(10) Patent No.: US 7,157,037 B2
(45) Date of Patent: Jan. 2, 2007

(54) APPARATUS FOR MAKING THREADED ARTICLES IN A PLASTIC INJECTION MOLDING PROCESS

(75) Inventors: Gerald Seidelman, Palm Harbor, FL (US); Albert Bruce Chalcraft, Seminole, FL (US)

(73) Assignee: Creating Mold Solutions, Inc., Palm Harbor, FL (US)

( * ) Notice: Subject to any disclaimer, the term of this patent is extended or adjusted under 35 U.S.C. 154(b) by 104 days.

(21) Appl. No.: 11/017,585

(22) Filed: Dec. 20, 2004

(65) Prior Publication Data

US 2006/0131787 A1    Jun. 22, 2006

(51) Int. Cl.
*B29C 33/04* (2006.01)
*B29C 45/44* (2006.01)

(52) U.S. Cl. ............... 264/318; 264/328.15; 425/547; 425/556; 425/DIG. 58; 249/59; 249/64

(58) Field of Classification Search ............ 264/328.1, 264/318, 334, 328.16; 425/556, 577, 809, 425/DIG. 58, 547; 249/64, 59
See application file for complete search history.

(56) References Cited

U.S. PATENT DOCUMENTS 5,061,168 A    10/1991   Fox
5,383,780 A    1/1995    McCready et al.
5,786,079 A    7/1998    Alieri
5,798,074 A *  8/1998    McCready et al. ......... 264/318
6,238,202 B1   5/2001    Joseph
6,390,800 B1   5/2002    Brown et al.
6,585,508 B1 * 7/2003    Zuffa .................... 425/DIG. 58
6,592,797 B1   7/2003    Graham et al.
6,599,115 B1   7/2003    Chalcraft et al.

* cited by examiner

Primary Examiner—Jill L. Heitbrink
(74) Attorney, Agent, or Firm—Dennis G. LaPointe

(57) ABSTRACT

A Bi-directional rack assembly that rotates one column of threaded cores and unscrews threaded closures while moving in the forward direction. The Bi-directional rack then mechanically changes position to engage an adjacent column of rotating threaded cores and at the end of a second molding cycle rotates the threaded cores and unscrew threaded closures while moving in the reverse (reset) direction. A set of timed-advance devices are engaged by a smaller pinion gear and idler gear assemblies to the Bi-directional rack and as the Timed-Advance devices are activated, they allow pneumatic pistons to advance the stripper plate in time with the threaded closures as they are being unscrewed from the threaded cores. A second "rapid advance" pneumatic piston eliminates the need for an external rapid rise camming feature. A rotating core comprising a stock, rotating core, a stock water-seal insert and a custom core top.

35 Claims, 22 Drawing Sheets

APPARATUS FOR MAKING THREADED ARTICLES IN A PLASTIC INJECTION MOLDING PROCESS

FIELD OF THE INVENTION

The invention relates to a mechanism in the injection molding process for forming threaded molded parts and for assemblies that are more easily maintained, repaired and replaced at reduced associated costs.

BACKGROUND OF THE INVENTION

Several methods to remove plastic thread forms from injection molds upon completion of the injection molding processes exist. The most common methods are as follows:
1. Unscrewing of the threads using rotating cores actuated by hydraulically operated racks or other mechanisms. The rotating cores are located in fixed locations and eject (push) the molded thread forms from the mold by rotation of the cores and a mechanically actuated, mechanically timed (cam action) stripper plate.
2. Unscrewing the molded part from a stationary (fixed) core through the use of a hydraulically actuated rack rotating a pinion assembly, which rotates "ratchet rings", for example, a Husky Rotating Ratchet Ring system. Ejection is done by the movement of a pneumatically actuated piston pushing against a stripper plate the forward motion of which is mechanically controlled by an external cam follower.
3. Unscrewing with the use of gear trains actuated by mechanical splines (Hasco system) and ejection by the movement of a mechanically actuated, mechanically timed stripper plate (see U.S. Pat. No. 6,599,115 to Chalcraft et al.).
4. Rotation of the threaded cores with gears actuated by electric or hydraulic gear motors and then ejected by the movement of a mechanically actuated, mechanically timed (cam action) stripper plate.
5. Mechanically stripping of the threaded parts from stationary (non-rotating) threaded cores. A stripper plate actuated by a hydraulic cylinder or the injection molding machine ejection system does this.
6. Unscrewing the rotating cores from the molded thread form with hydraulically actuated racks. The rotating cores move downward into a stationary threaded nut.

The method most commonly used during the injection molding process employs the use of rotating cores actuated by hydraulically operated racks or other mechanisms as described in Method 1 above. In all but the last method, a stripper plate is used to assist with the removal of the molded parts.

In these molds, the stripper plate needs to rise in time with the thread pitch of the molded part. The purpose of the stripper plate is to maintain pressure against the injection-molded part and to insure a controlled vertical movement off of the rotating threaded core. Anti-rotation "teeth" are normally molded into the bottom of the threaded closure. This is to insure that the closure is held in a fixed location while the threaded core unscrews from the inside of the molded part.

In virtually every case, the upward speed and movement of the stripper plate is controlled by an external camming mechanism that is attached to the same "cross-head" mechanism that moves the racks forward and back. Springs are the most commonly used method to assist the stripper plate back to its closed (home) position.

The external location of this camming mechanism usually requires a mold base that is wider than necessary to accommodate the rotating cores only. This additional mold base width is used to contain guides and supports for this mechanism. It is a system that requires components such as the pitch cam, the rapid rise cam, the lifter cam, rollers; guides, wear plates and the cam bar used to contain many of these components.

The injection molding sequence that uses the conventional rack and external camming mechanism is as follows:
1. With stationary and movable halves of the injection mold mounted to the stationary and movable platens of the molding machine, with the machine in the open position, and with the crosshead assembly which holds the gear racks in the up (home) position.
2. The movable half of the mold closes with the stationary half of the mold.
3. Melted plastic material is injected into the cavities of the closed mold.
4. The material is cooled during a timed holding period.
5. When this period ends, the movable half of the mold separates from the stationary half of the mold.
6. A hydraulic cylinder actuates the crosshead assembly to which one or more gear racks are attached. These racks rotate cores that have a thread form machined onto them. The rotating threaded cores will also have a spur gear tooth form on one diameter and this will engage with the rack. The initial forward motion of the cylinder is used to rotate the threaded cores in such a direction so as to unscrew the molded thread from the rotating core. This rotation is normally in a clock-wise (CW) direction.
7. While the threaded cores are rotating, a stripper plate is mechanically lifted in time with the pitch of the molded thread form in order to assist with the ejection of the molded part. The timed movement of the stripper plate is accomplished by the external camming mechanism.
8. Once the part has been ejected from the mold, the hydraulic cylinder, external camming actions, stripper plate, crosshead mechanism and rack must return to their original position in order to be in place for the next cycle. Once all components reach the home position, the mold will once again close and be ready for the next molding cycle.

The unscrewing system as described adds time to the molding cycle, reduces production efficiencies, contributes to component wear and increases the maintenance costs involved with keeping a mold in operating condition. But, at present this is "state of the art" technology. Visit any molding room and you will find this type of mold in operation wherever closures are being produced.

Here are a few examples of wasted time, wasted motion and wasted money.
1. As the mold opens, the hydraulic cylinder, crosshead assembly, racks, rotating cores and external camming mechanism all move in a forward motion (under load) to unscrew the molded part. Once the part has been ejected, the movement of the hydraulic cylinder is reversed and it returns (without load) to the home position. During this operation, all mold components (racks, rotating cores, camming mechanism, etc.) are also returned to their original position. The reverse movement without actual work being produced is wasted motion and wasted time.
2. The external camming mechanism also includes a "rapid rise" cam segment. Once the unscrewing of the threaded closure is complete, the rack continues its' forward movement along this "rapid rise" cam. The purpose of this cam is to quickly raise the stripper plate at an accelerated speed to shake off or separate and/or eject any molded parts that may want to stick to the stripper plate and anti-rotation teeth. This distance of travel is added to the distance required to unscrew the closure. Since unnecessary distance relates to unnecessary time and unnecessary component wear, this system contributes to lost time and increased costs.

3. Due to the time required to return the cylinder and all components to their original position valuable production time is lost before another molding cycle can begin.

4. Due to the unnecessary distance all components must travel while the cylinder is being returned to its original position, wear on bearings, bearing surfaces, dynamic seals and all moving components is doubled. This requires more maintenance cycles per year. These maintenance cycles take the mold out of production (perhaps for several days at a time) and have a dramatic impact on production output.

5. Due to the use of the external camming mechanism and all related hardware, the size of the mold is increased. This increase in size may adversely affect the overall size of the mold to a point that it will require a larger molding machine. This usually means increased pricing because of higher machine rates for larger molding machines.

SUMMARY OF THE INVENTION

The present invention is a redesigned system that saves time and reduces the cost of ongoing maintenance. The plastics industry has always searched for ways to make molded products faster, cheaper, better, at lower cost and with minimal maintenance. They are constantly searching for the lowest cost per part possible.

The design features and construction of this new invention provide ways to achieve each and every one of these goals. The invention is comprised of three (3) separate developments that all work together with results that can produce molded products faster, cheaper; better, at lower cost and with minimized maintenance. The three devices are:

1. A Bi-directional rack that while engaged with one row of rotating cores and during one molding cycle rotates one column of threaded cores and unscrews threaded closures while moving in the forward direction. The Bi-directional rack then mechanically changes position to engage an adjacent column of rotating threaded cores and at the end of a second molding cycle rotates the threaded cores and unscrew threaded closures while moving in the reverse (reset) direction.

2. A set of Timed-Advance devices that are engaged by a smaller gear assembly and idler gears to the Bi-directional rack and as the Timed-Advance devices are activated, they allow pneumatic pistons to advance the stripper plate in time with the threaded closures as they are being unscrewed from the threaded cores. These Timed-Advance devices are usually placed within the mold at the end of rotating core columns. They replace the need for the external camming mechanism and allow for the smallest possible mold width to be realized. A second "rapid advance" pneumatic piston is also an optional part of this design and eliminates the need for an external rapid rise camming feature. Of course, it is understood that other features described herein could incorporate, instead of the pneumatic timed advance and rapid advance features discussed here, a prior art camming mechanism designed to operate in both directional operations of the bi-directional rack assemblies.

3. A specially designed rotating core that separates the function of these normally "custom" components into three distinct categories. A stock rotating core, a stock water-seal insert and a custom core top. Since these rotating cores function with the Bi-directional rack system, they rotate in only one direction. This feature allows both the custom core top and the replaceable water-seal insert (in the bottom of the core) to be simply screwed into place (thread of opposite hand from the direction of rotation) without the need to key or lock them into place. This allows for the rapid replacement of custom core tops and water-seal inserts either as a function of repair or replacement in the mold while still in the molding machine.

In unscrewing molds, the rotating cores are arranged in a number of adjacent vertical columns and horizontal rows. The present invention places a bi-directional rack assembly on the outside of the two outermost columns of rotating cores and in-between columns of rotating cores. Idler gears can be placed between columns of rotating cores engaged by the bi-directional rack and engage rotating cores not engaged with the Bi-directional rack. These idler gears transfer the unscrewing motion to the adjacent rotating cores. Because the idler gear that engages this rotating core also engages a rotating core in the next column of rotating cores, a single bi-directional rack can actuate more than one column of rotating cores. This arrangement allows bi-directional racks to engage the gear teeth of the rotating cores on its right hand side during the forward stroke. After the first molding sequence is complete and the molded parts are to be unscrewed, the Primary pneumatic pistons are activated. This pushes the stripper plate up 0.005–0.010 (inch) to relieve clamping pressure on the tapered shutoff surface of the rotating cores. Then as the racks move forward, they will rotate the cores (on the right side) in a clockwise (CW) direction, unscrewing threaded closures that have right-hand (RH) threads. At the end of the forward stroke, the bi-directional racks will stop their forward motion while the upper and lower actuating bars continue movement for a short distance. During this motion, the upper and lower actuating bars, by mechanical action, cause the bi-directional rack to disengage from the rotating cores on its right side and engage the rotating cores on its left side (adjacent column).

After the next molding sequence is complete and the molded parts are to be unscrewed, the Primary pneumatic pistons are once again activated. This pushes the stripper plate up 0.005–0.010 (inch) to relieve clamping pressure on the tapered shutoff surface of the rotating cores as the racks move in the reverse direction. The bi-directional racks will rotate the cores (on the left side) in a clockwise (CW) direction, unscrewing threaded closures that have right-hand (RH) threads. At the end of the reverse stroke, the bi-directional racks will stop their reverse motion while the actuating bars continue for a short distance. During this motion, the upper and lower actuating bars, by mechanical action, cause the bi-directional rack to disengage from the rotating cores on its left side and engage the rotating cores on its right side (adjacent column). The outermost bi-directional racks will only engage rotating cores to their left or right depending on placement in the mold.

Gear teeth are formed or machined onto both sides of the bi-directional rack to allow the rack to engage gears on either side of the rack. Angular slots are formed or machined into both top and bottom sides of the bi-directional rack. Mating ribs are machined onto the top face of the lower actuating bar and onto the lower face of the upper actuating bar. The slots in the rack are longer than the ribs on the actuating bars, allowing for movement back and forth within the slots.

As mentioned above, gear teeth are cut on both sides of the rack and angular slots are cut into both the top and bottom faces. These slots are designed to accept the ribs machined on the actuating bars. So looking at the top of the rack, the angular slots on the top and bottom of the rack are cut in the same direction. The slots in the rack are of sufficient length so as to allow movement of the rack from one side to the other (approximately ¼") when forward or back motion is applied to the actuating bars.

The actuating bars are manufactured out of material that should have good bearing characteristics. As mentioned, the actuating bars have complimentary ribs cut on either the top or bottom sides. The ribs will be shorter than the slots machined into the rack so as to allow for the side-to-side movement required. The three remaining sides of these bars are sized to fit into individual pockets in the mold base that are suitably machined to provide a sliding fit with each actuating bar. The pockets in the mold base will provide guidance, alignment and support for the bi-directional rack assembly.

With gear teeth cut on both sides of the rack, every mold design using this bi-directional rack system will be able to place the columns and rows of rotating cores into the mold with minimum pitch-to-pitch spacing. With the close location-to-location spacing of each rotating core, the optimal number of threaded cores/cavities can be placed inside of the mold's footprint. This compression optimizes mold cavitation, molding machine capacity and production while minimizing mold size, production cost and maximizing production output.

DETAILED DESCRIPTION OF THE INVENTION

Figure 1A:
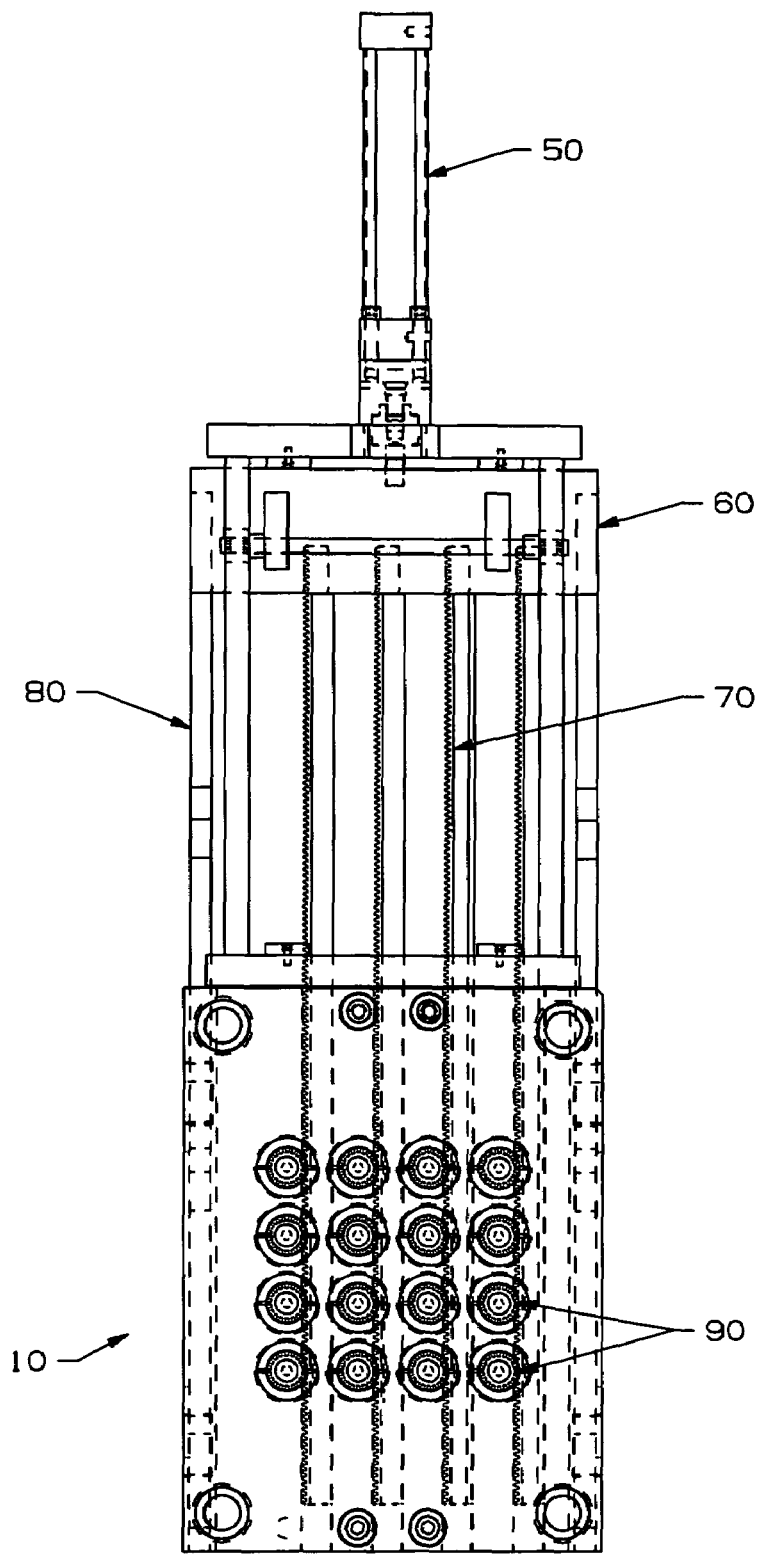
FIG. 1a shows the complete assembly of a prior art unscrewing mold 10 and its components such as the hydraulic cylinder 50, crosshead assembly 60, the conventional racks 70, the advance bars (external camming method) 80 and the rotating cores 90 in the reverse (home) position.
Figure 1B:
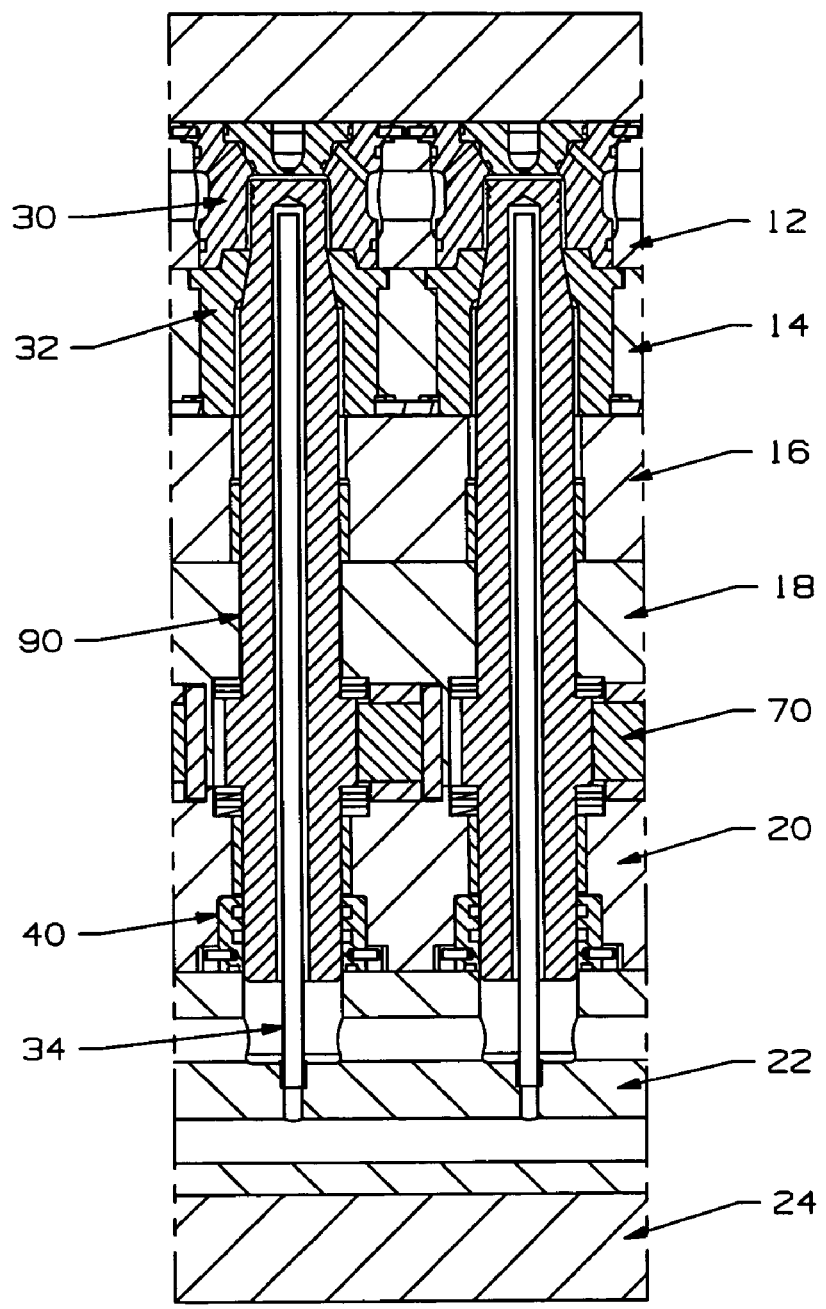
FIG. 1b is a sectional view of a prior art unscrewing mold (in the closed position) showing the current unscrewing core design 90, the cavity insert 30, the stripper ring 32, the water seal bushing 40, the bubbler tube 34 and the conventional racks 70 and the drawing further shows how the racks engage with the rotating cores.
Figure 1C:
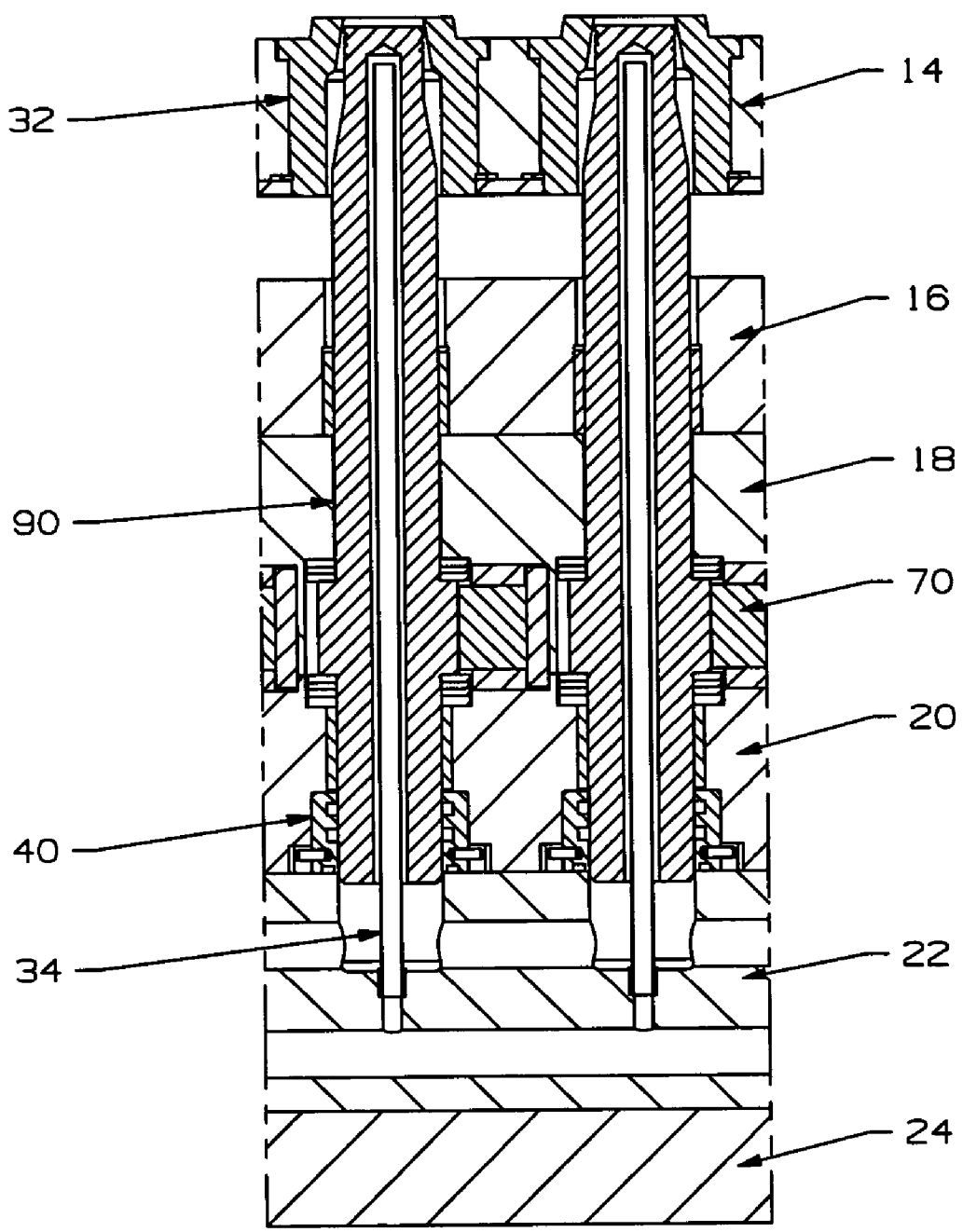
FIG. 1c is a sectional view of the prior art unscrewing mold of FIG. 1b showing how the stripper plate 14 advances as the rotating core 90 is rotated, where as the stripper plate 14 advances, the molded part is ejected from the mold by the stripper ring 32.
Figure 1D:
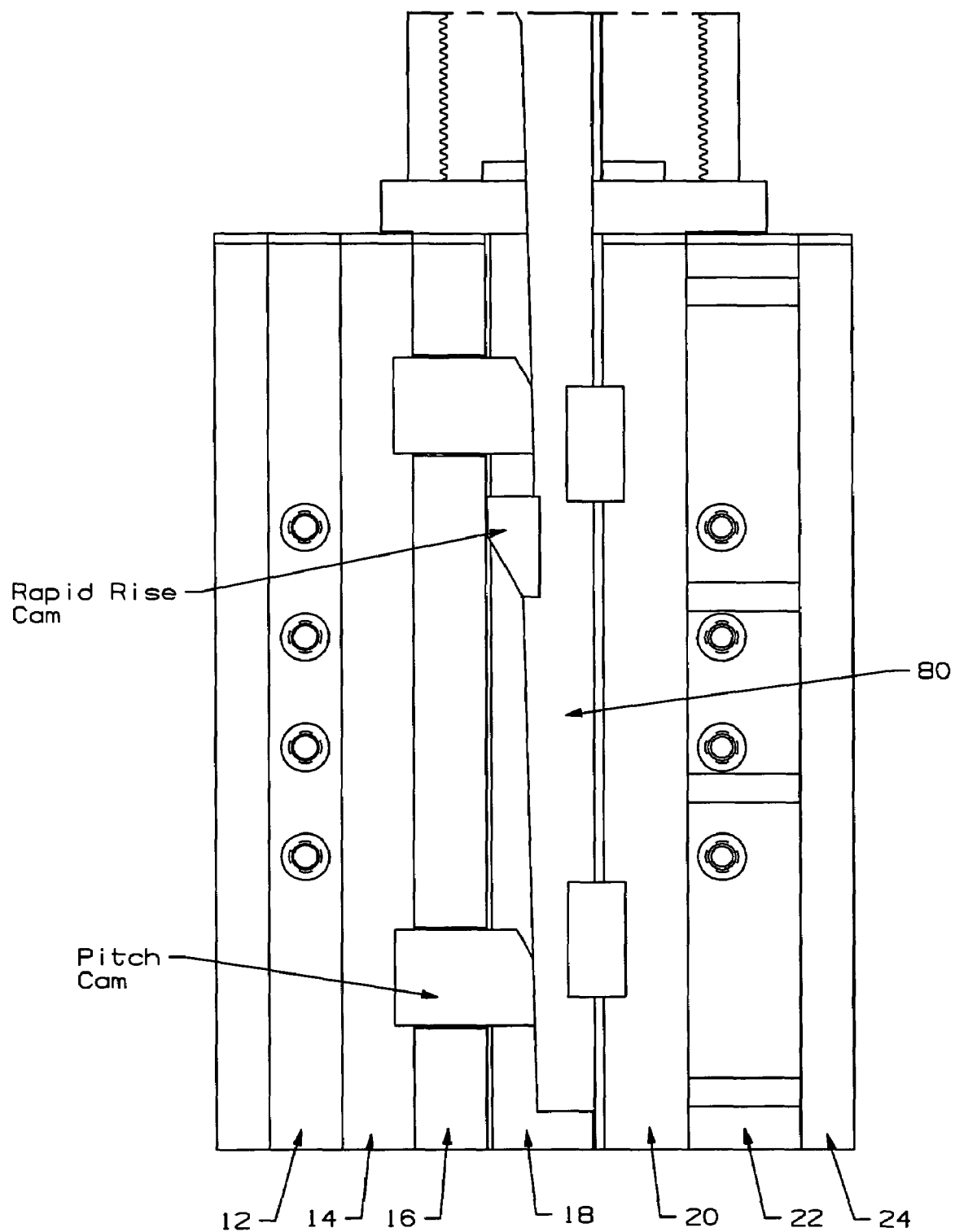
FIG. 1d shows a side view of the outside of a prior art unscrewing mold with the placement of the advance bar 80 as it is in the reverse (home) position with the hydraulic cylinder (not shown) in the full back (up) position.
Figure 1E:
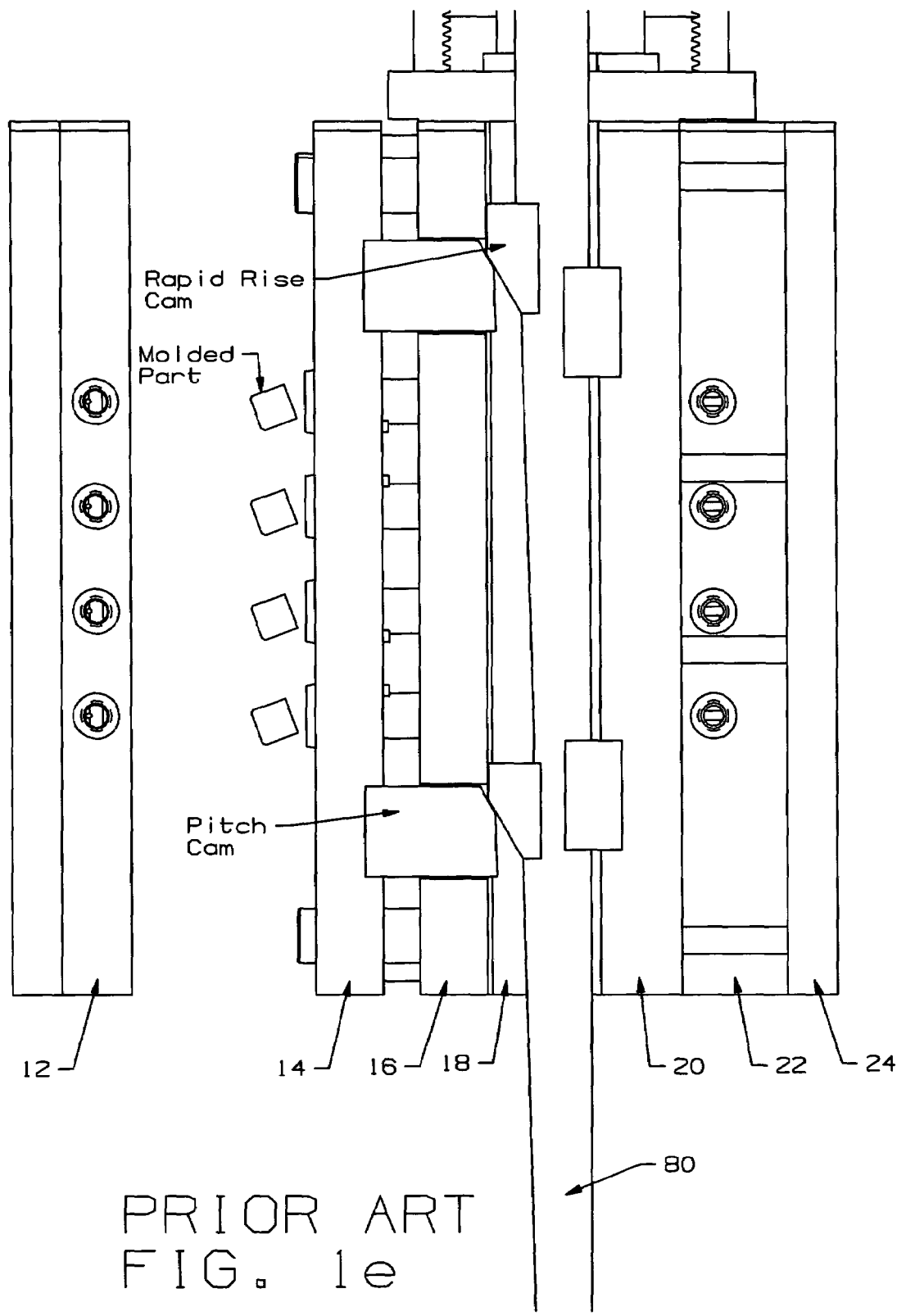
FIG. 1e shows a prior art mold as it is ejecting molded threaded closures (molded part) with the advance bar 80 in the forward position with the hydraulic cylinder (not shown) in the full forward (down) position wherein the racks have unscrewed the molded parts and the rapid rise cam that is mounted in the advance bar 80 has lifted the stripper plate 14 to the full eject position.
Figure 2:
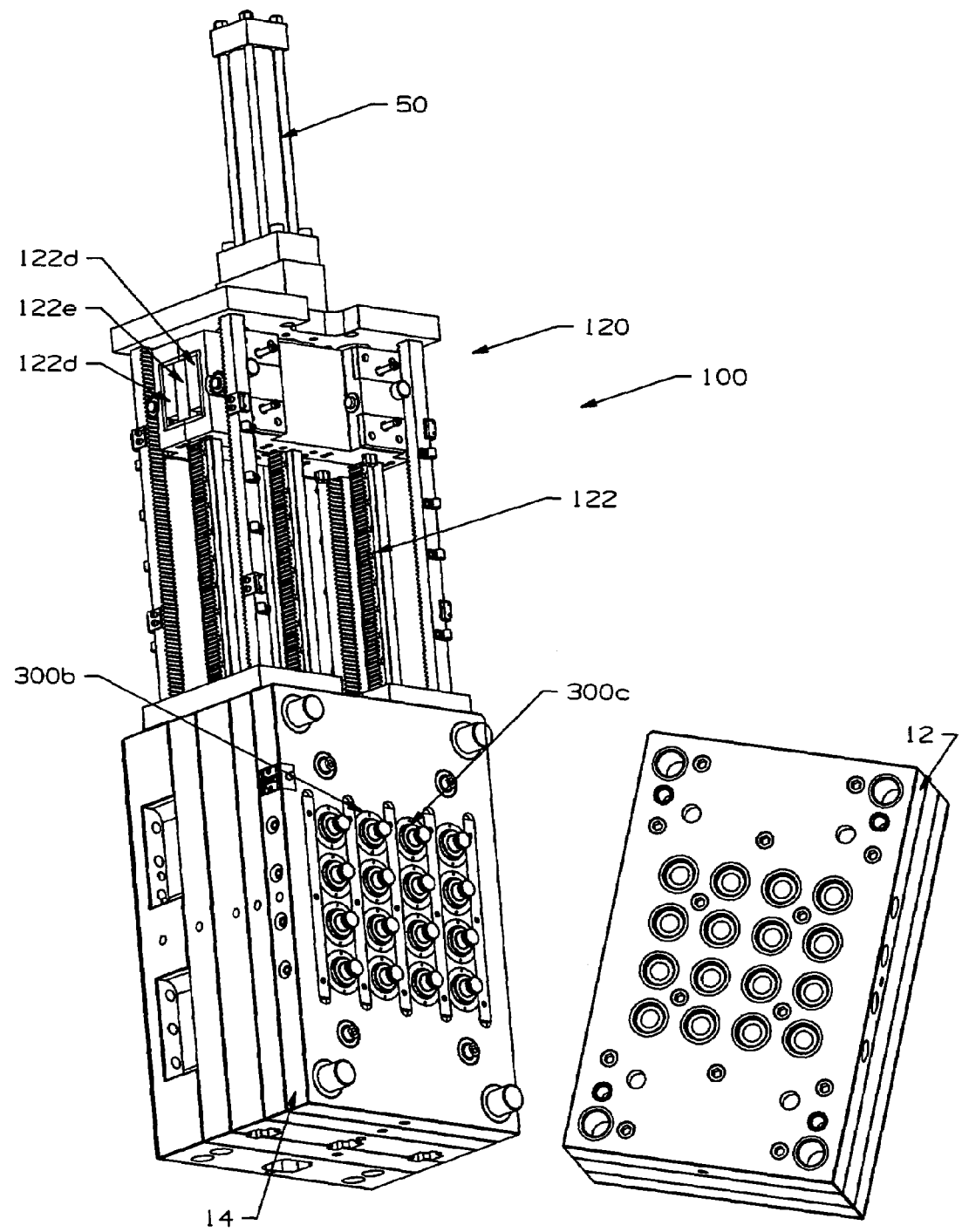
FIG. 2 is a view of the newly designed unscrewing mold showing the complete assembly and components such as the hydraulic cylinder 50, the newly developed crosshead assembly 120, the Bi-directional racks 122 and adjacent columns of rotating cores 300b,300c.
Figure 3:
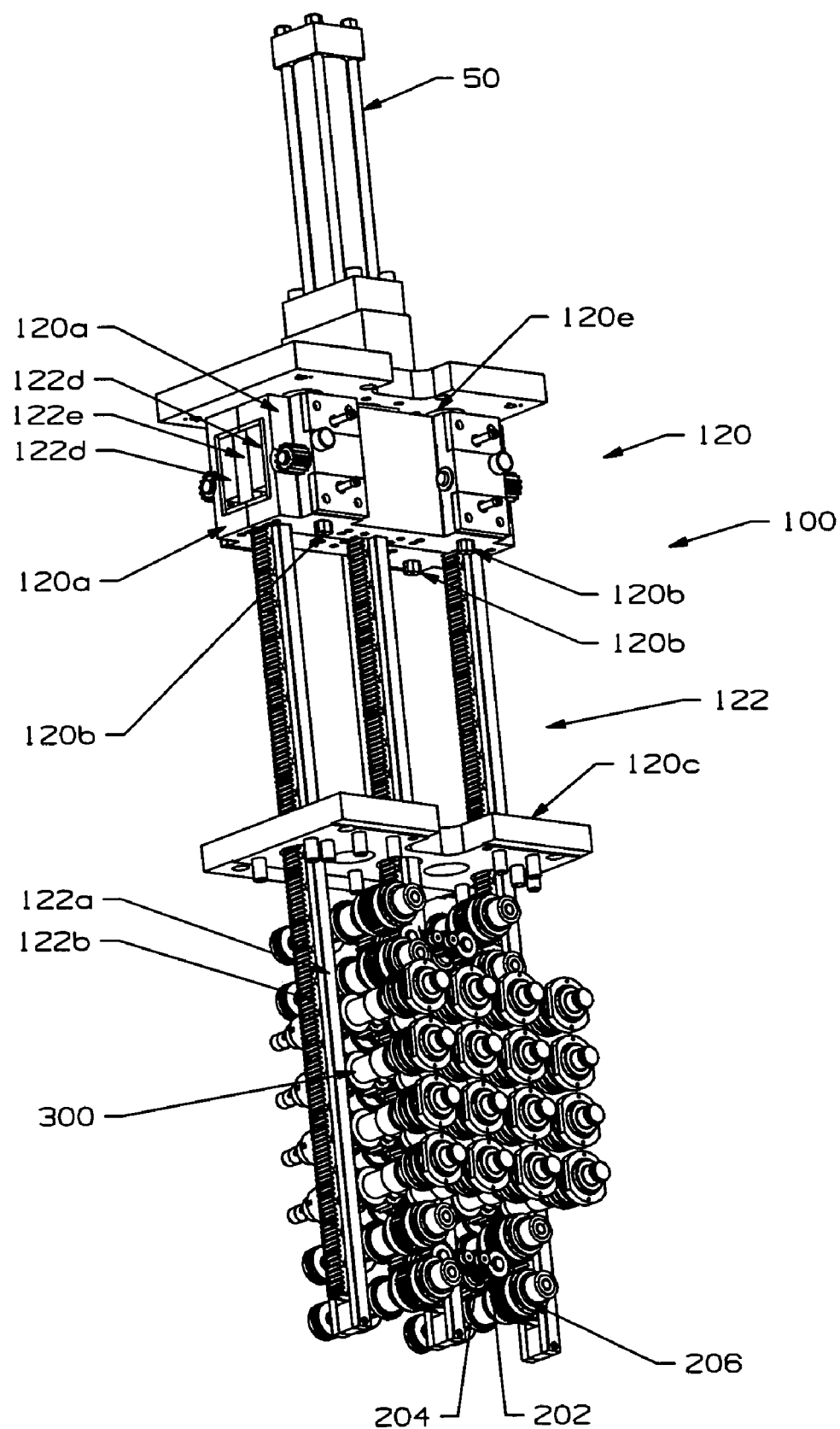
FIG. 3 is a view of the newly designed unscrewing mold with the mold plates removed to better view the key components and to better show how those components interact, including the hydraulic cylinder 50, the newly designed crosshead assembly 120, the bi-directional rack assembly 122, the timed advance device components 206, the pinion gear assembly 204, the idler gears 202 and the newly designed rotating core 300.
Figure 4:
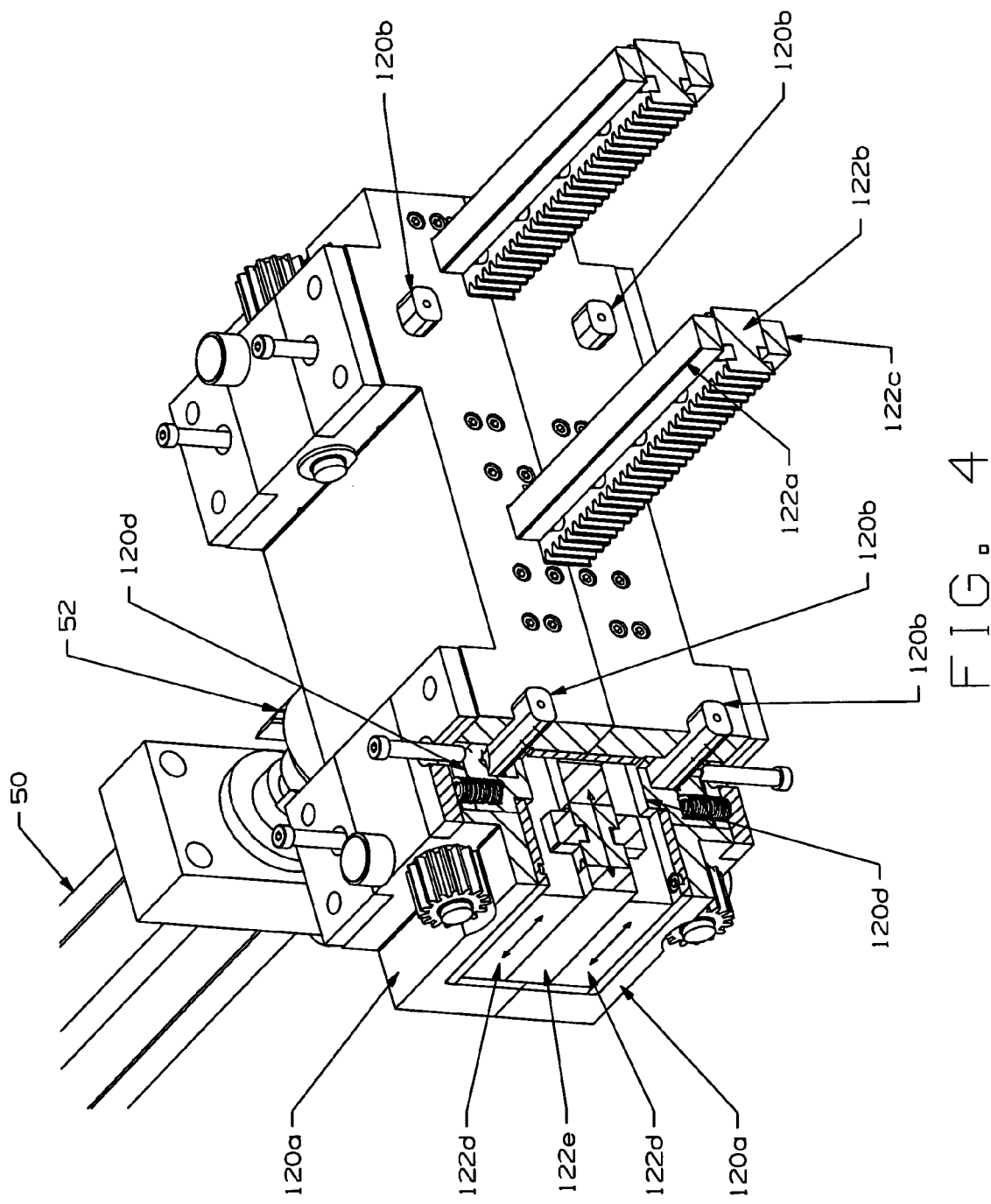
FIG. 4 shows the newly designed crosshead assembly 120 illustrating many of the components that are necessary to cause the bi-directional rack 122 to move from one column of rotating cores to its adjacent column of rotating cores.
Figure 5:
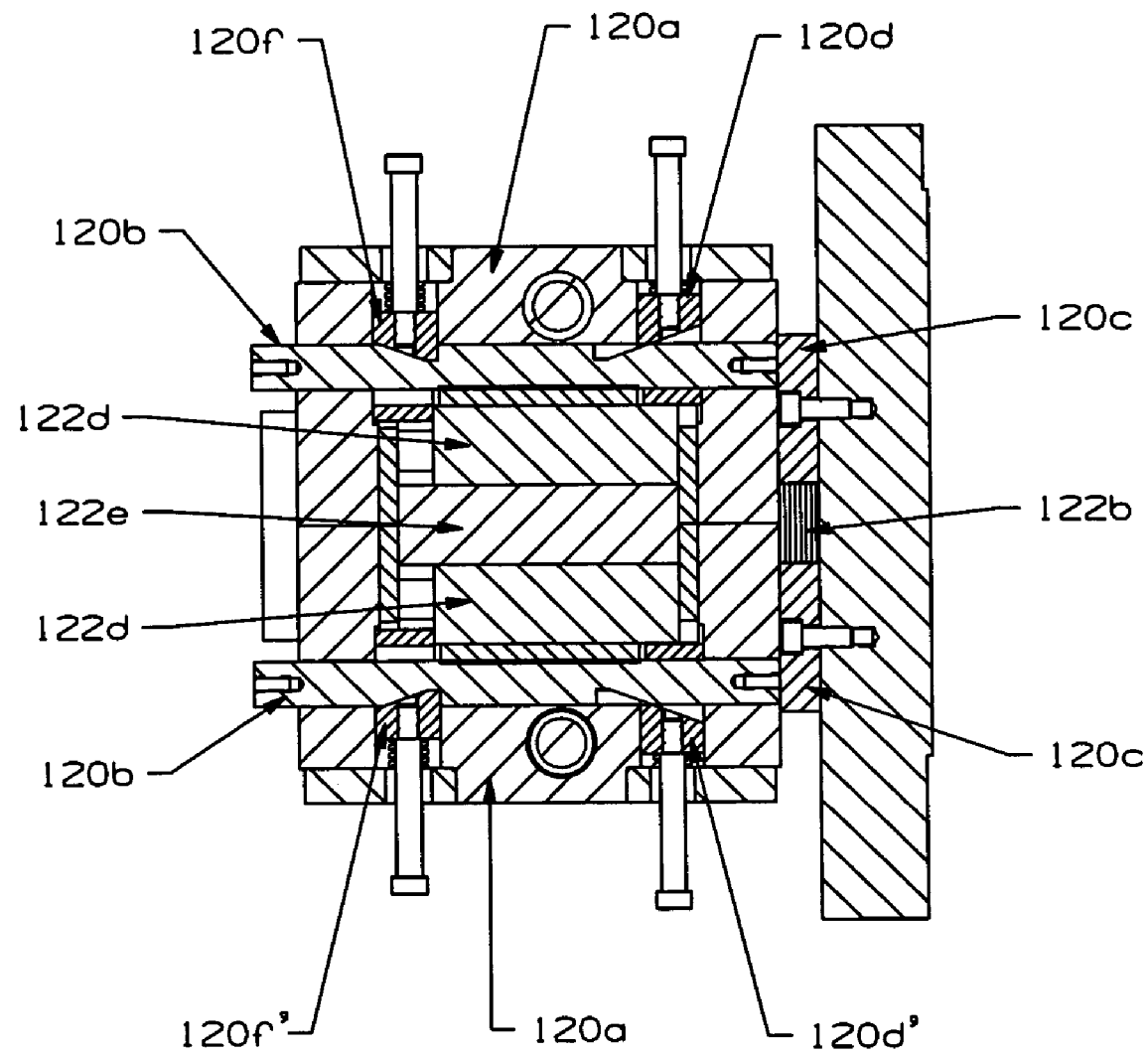
FIG. 5 shows the crosshead assembly 120 in the "forward" position illustrating how the upper and lower cam bars 120b cause the upper and lower front latch bars 120d,120d' to disengage from the actuating bar mounting plates 122d while the upper and lower rear latch bars 120f,120f' engage the actuating bar mounting plates 122d.
Figure 6:
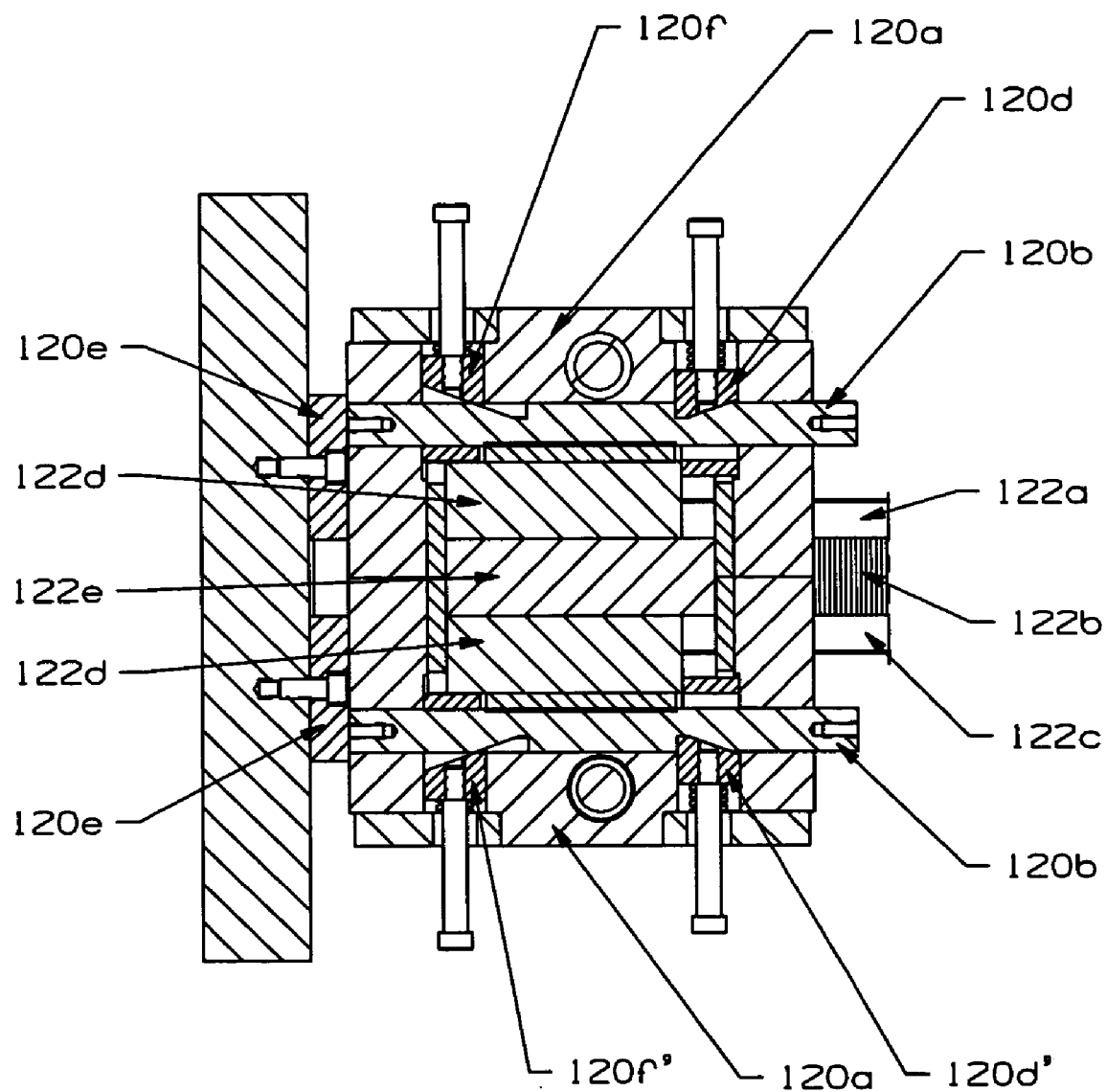
FIG. 6 shows the crosshead assembly 120 in the "reverse" position illustrating how the upper and lower cam bars 120b cause the upper and lower rear latch bars 120f,120f' to disengage from the actuating bar mounting plates 122d while the upper and lower front latch bars 120d,120d' engage the actuating bar mounting plates 122d.
Figure 7:
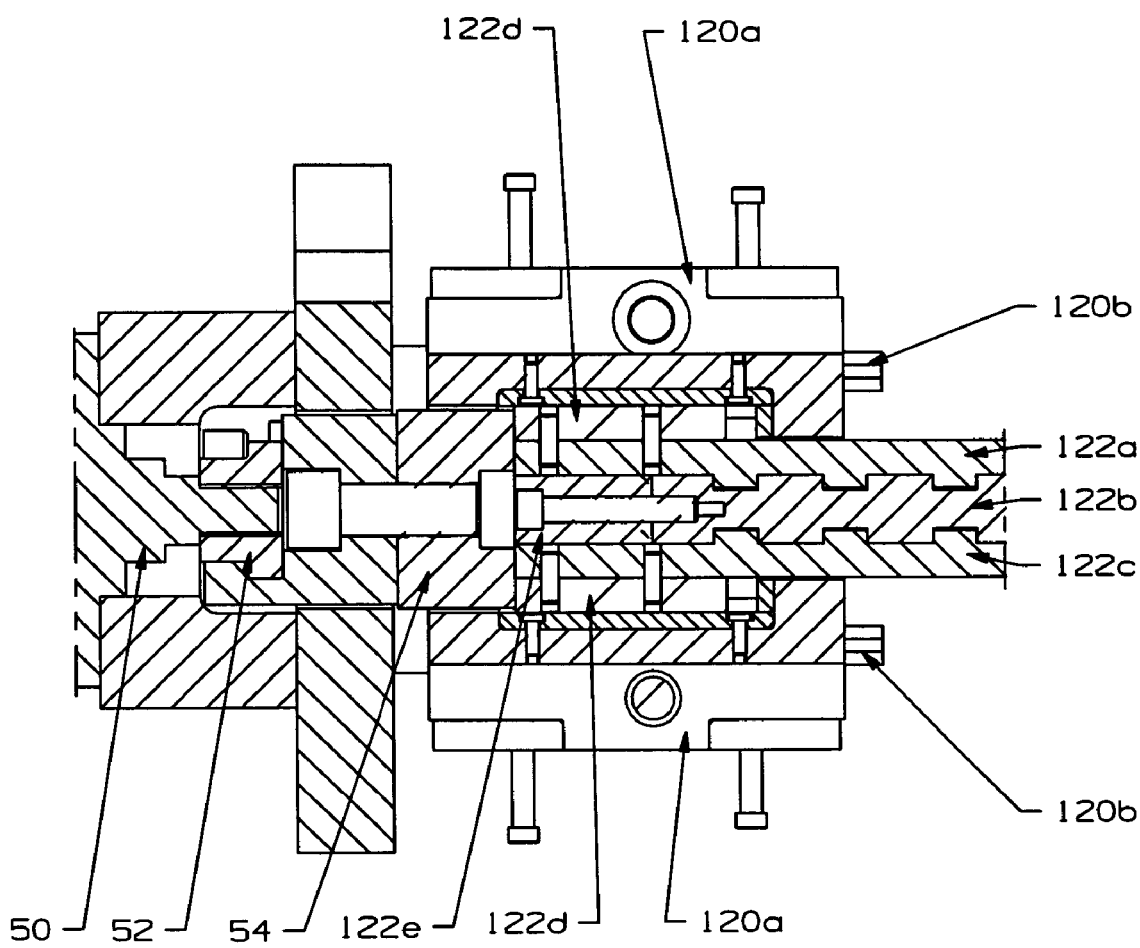
FIG. 7 is a view through the center of the crosshead assembly showing how the hydraulic cylinder 50, cylinder coupling 52 and the rack actuator bracket 54 work together to move the upper and lower actuating bar mounting plates 122d independently from the bi-directional rack mounting plate 122e.
Figure 8A:
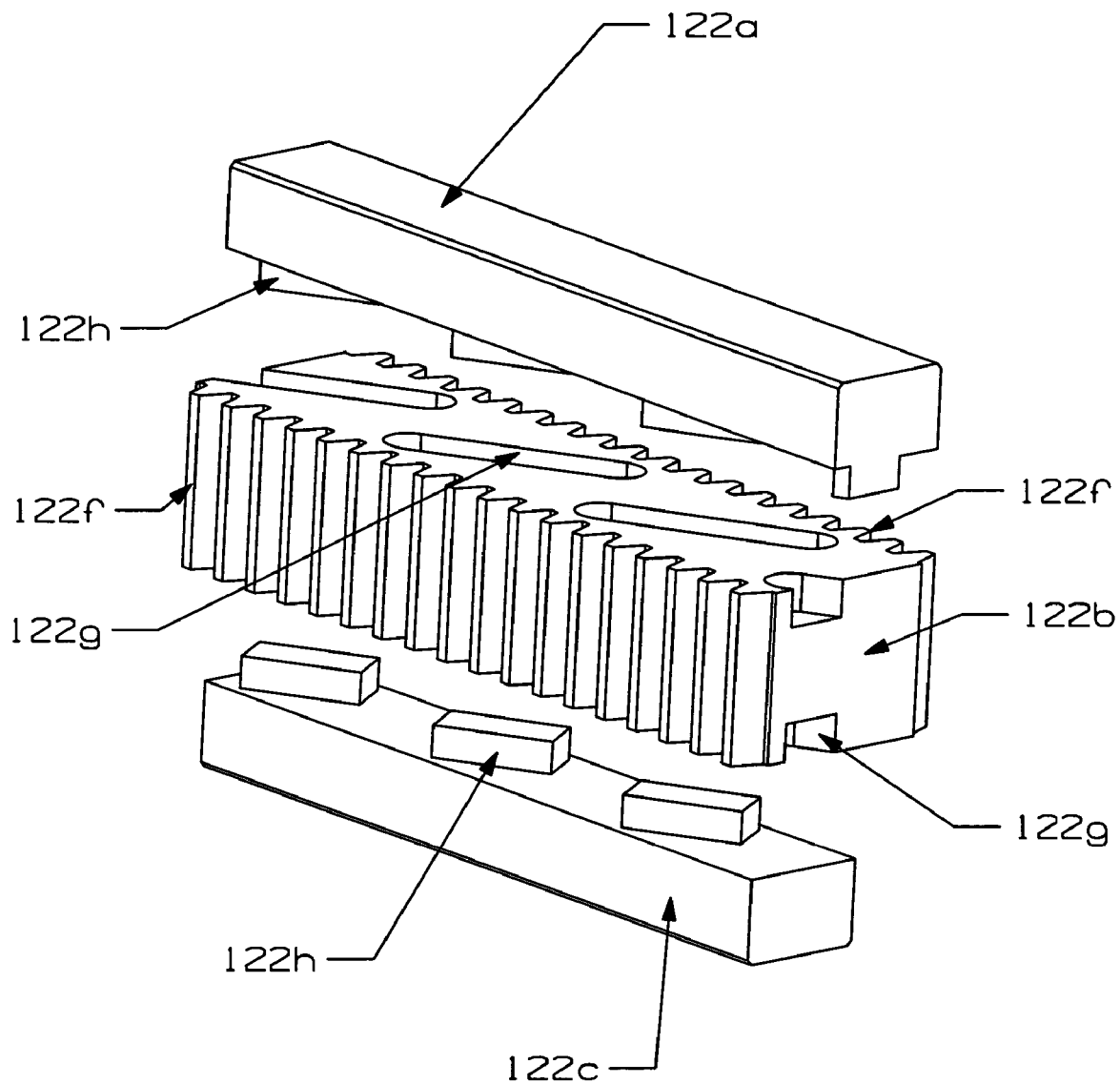
FIG. 8a is an exploded view of the bi-directional rack assembly 122 illustrating how the upper actuator bar 122a and the lower actuator bar 122c mate with the bi-directional rack 122b to change the forward and reverse movement of the upper and lower actuator bars 122a,122c into side-to-side movement of the bi-directional rack 122b.
Figure 8B:
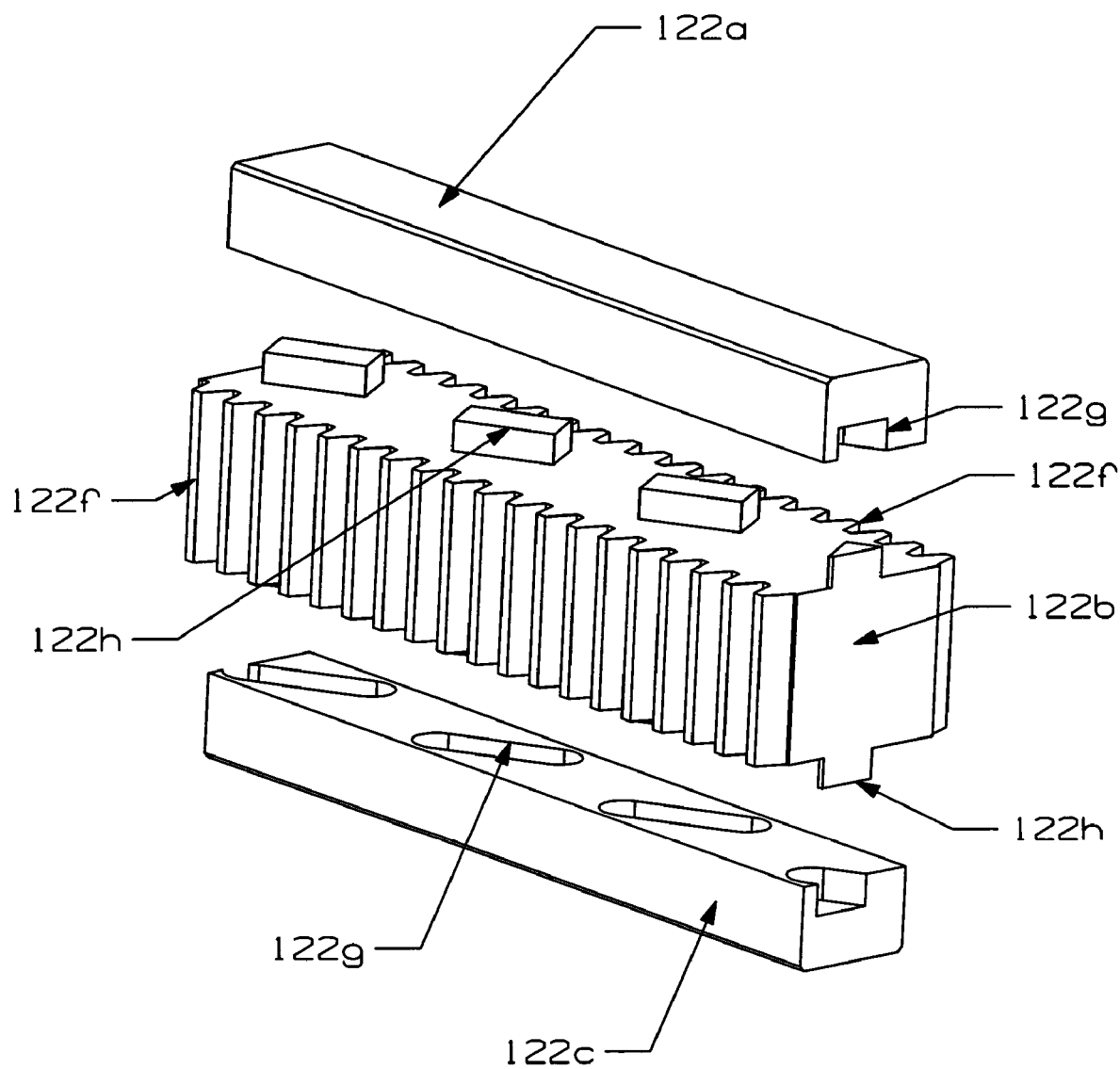
FIG. 8b is a drawing similar to FIG. 8a shown to conceptually depict the reversal configuration of the ribs 122h and slots 122g.
Figure 9:
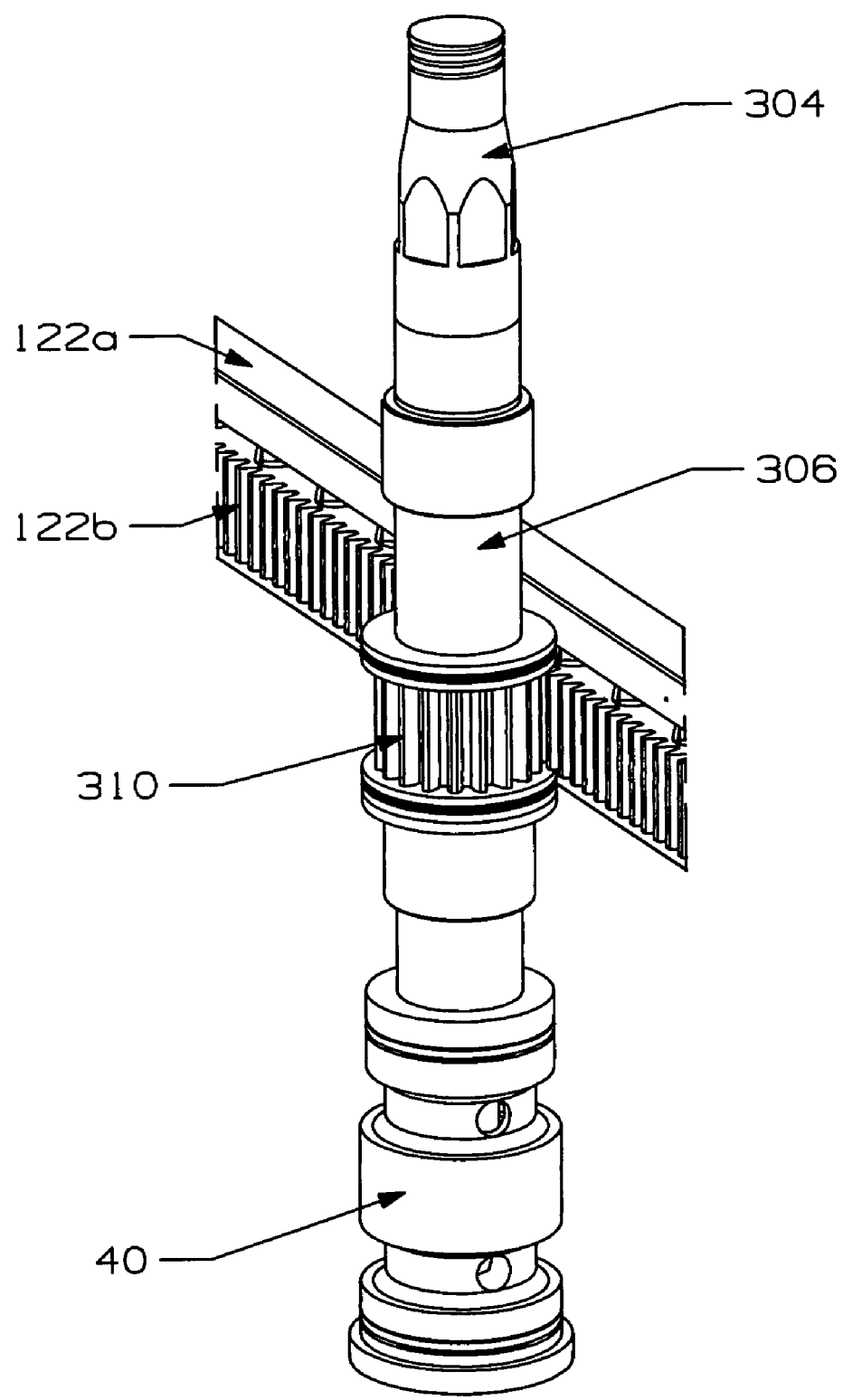
FIG. 9 shows how gear teeth on the rotating core 306 engage with the gear teeth of the bi-directional rack 122b.
Figure 10:
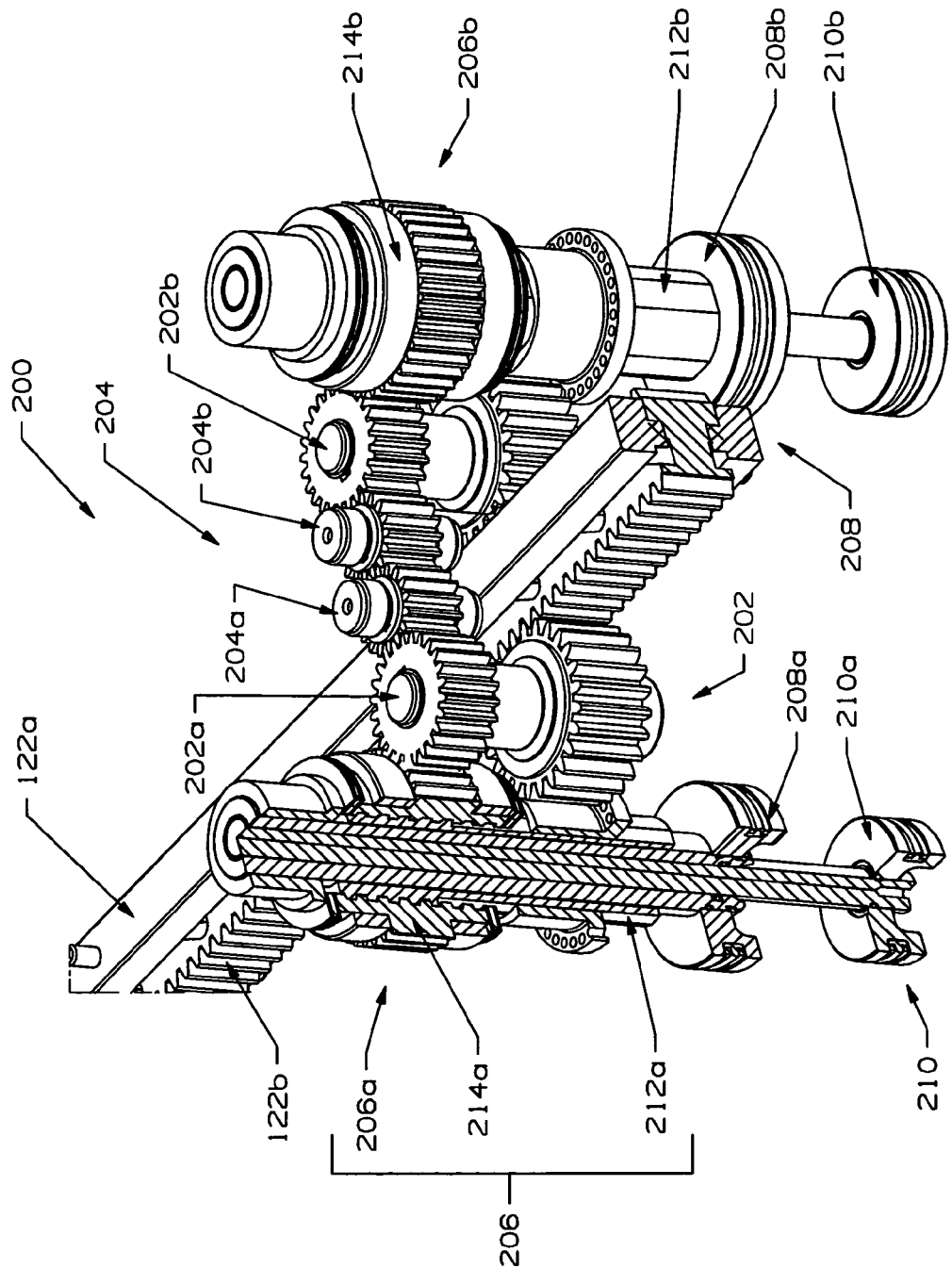
FIG. 10 is a view of the timed advance mechanism, its components and how the various assemblies interact with the bi-directional rack 122b further illustrating how the forward motion of the bi-directional rack 122b mates with the pinion assembly 202a, which rotates the timed advance assembly 214a, the idler gear assemblies 204, the pinion gear assembly 202b and finally timed advance assembly 214b.
Figure 11:
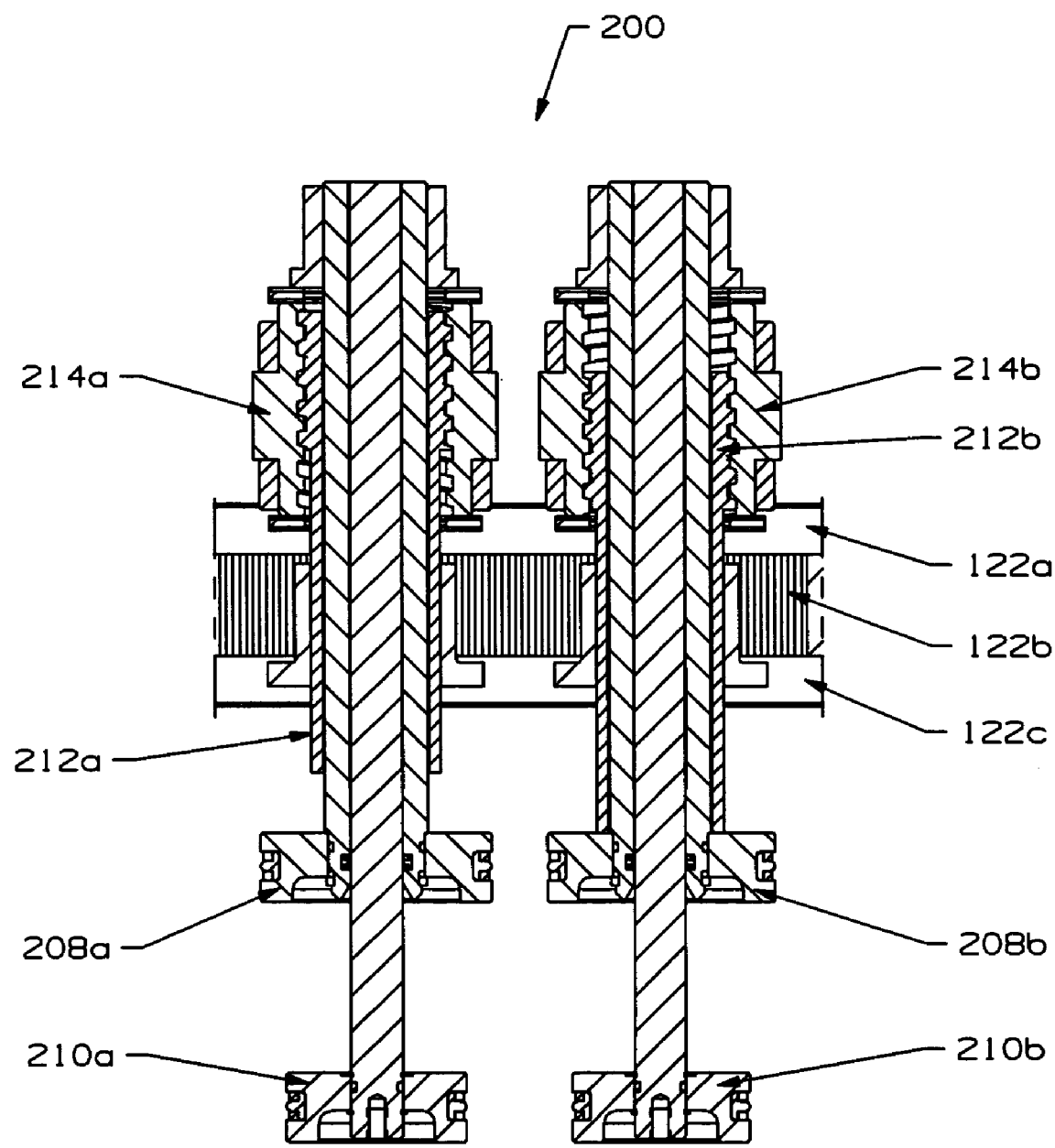
FIG. 11 is a sectional view of two timed advance assemblies where during the forward stroke of the bi-directional rack 122b, the threaded core 212a of the timed advance assembly is in position to move downward to a reset position that will allow it to control the upward movement of the timed advance piston 208a during the reverse stroke of the bi-directional rack 122b, and during the same forward stroke of the bi-directional rack 122b, the threaded core 212a allows the timed advance piston to move upward pushing the stripper plate (not shown) forward in time with the unscrewing pitch of the rotating core.
Figure 12:
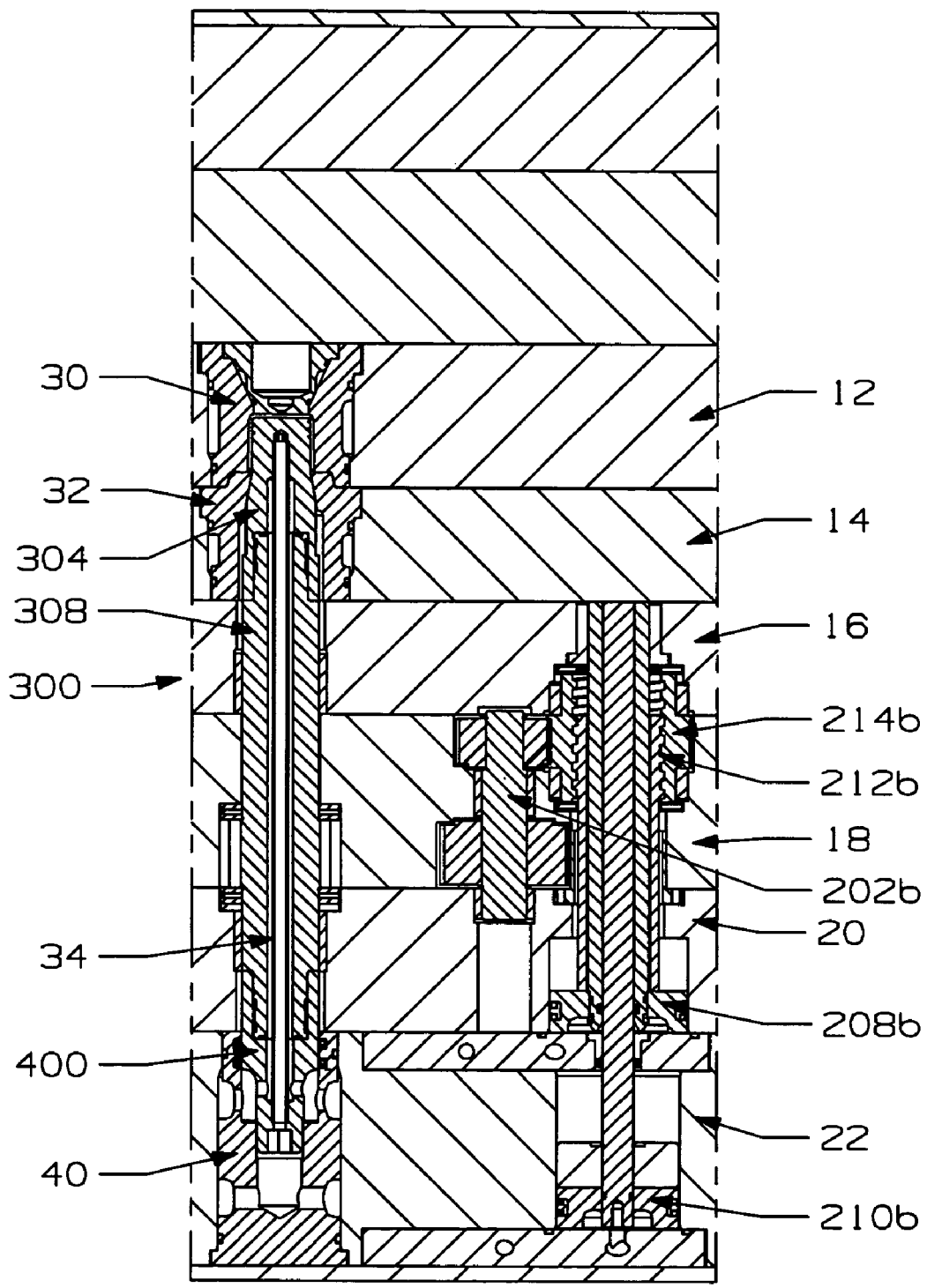
FIG. 12 is a sectional view of the newly designed unscrewing mold in the closed position showing the relationship of the newly designed rotating core 300, the timed advance assembly 214b, the timed advance piston 208b, the rapid advance piston 210b and the pinion gear assembly 202b as positioned in the mold.
Figure 13:
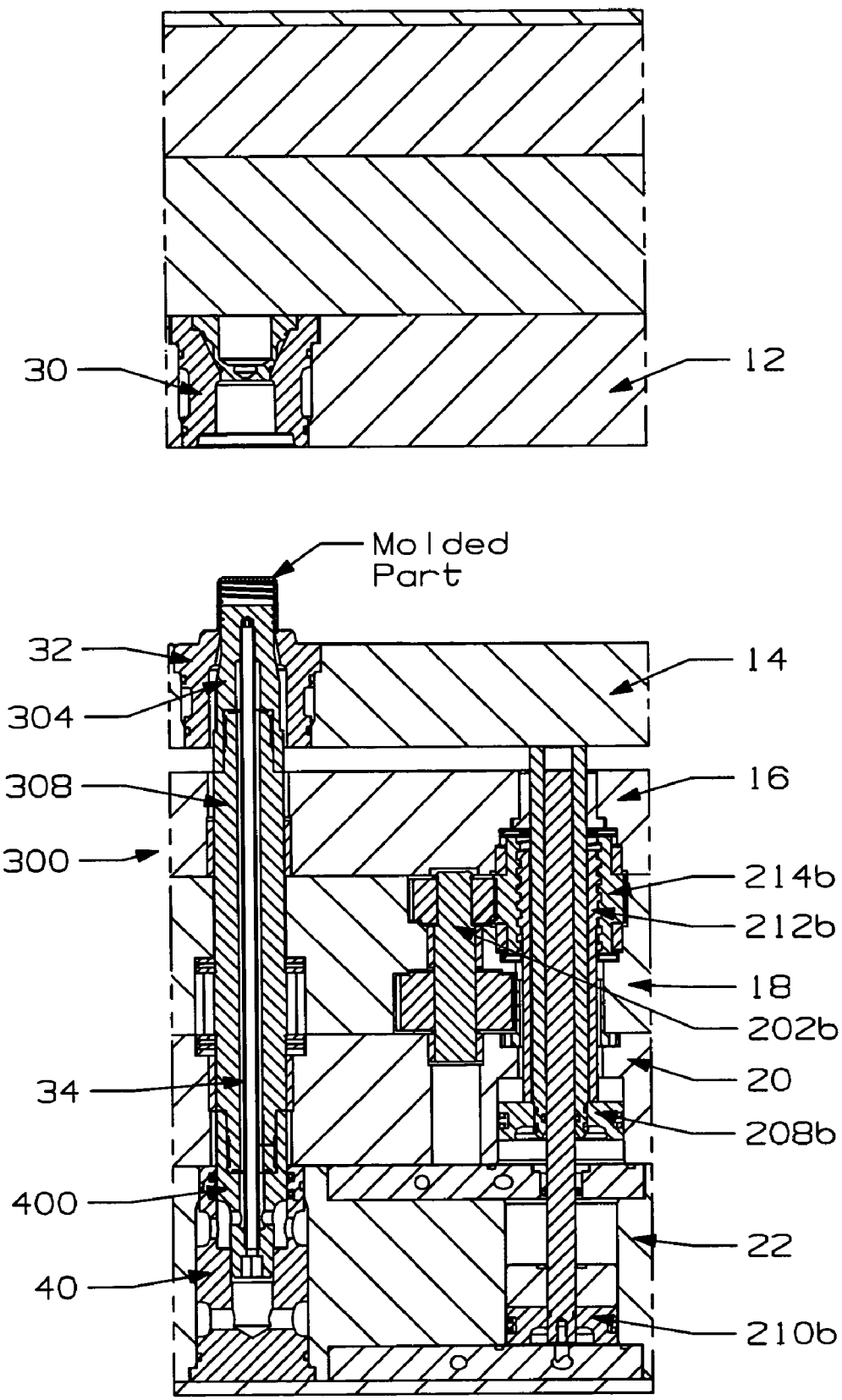
FIG. 13 is a sectional view of the newly designed unscrewing mold in the open position and shows the newly designed rotating core 300 after it has been rotated and the molded part has been unscrewed, the timed advance piston 208b has advanced, moving the stripper plate 14 forward, and the rapid advance piston 210b has not yet been actuated.
Figure 14:
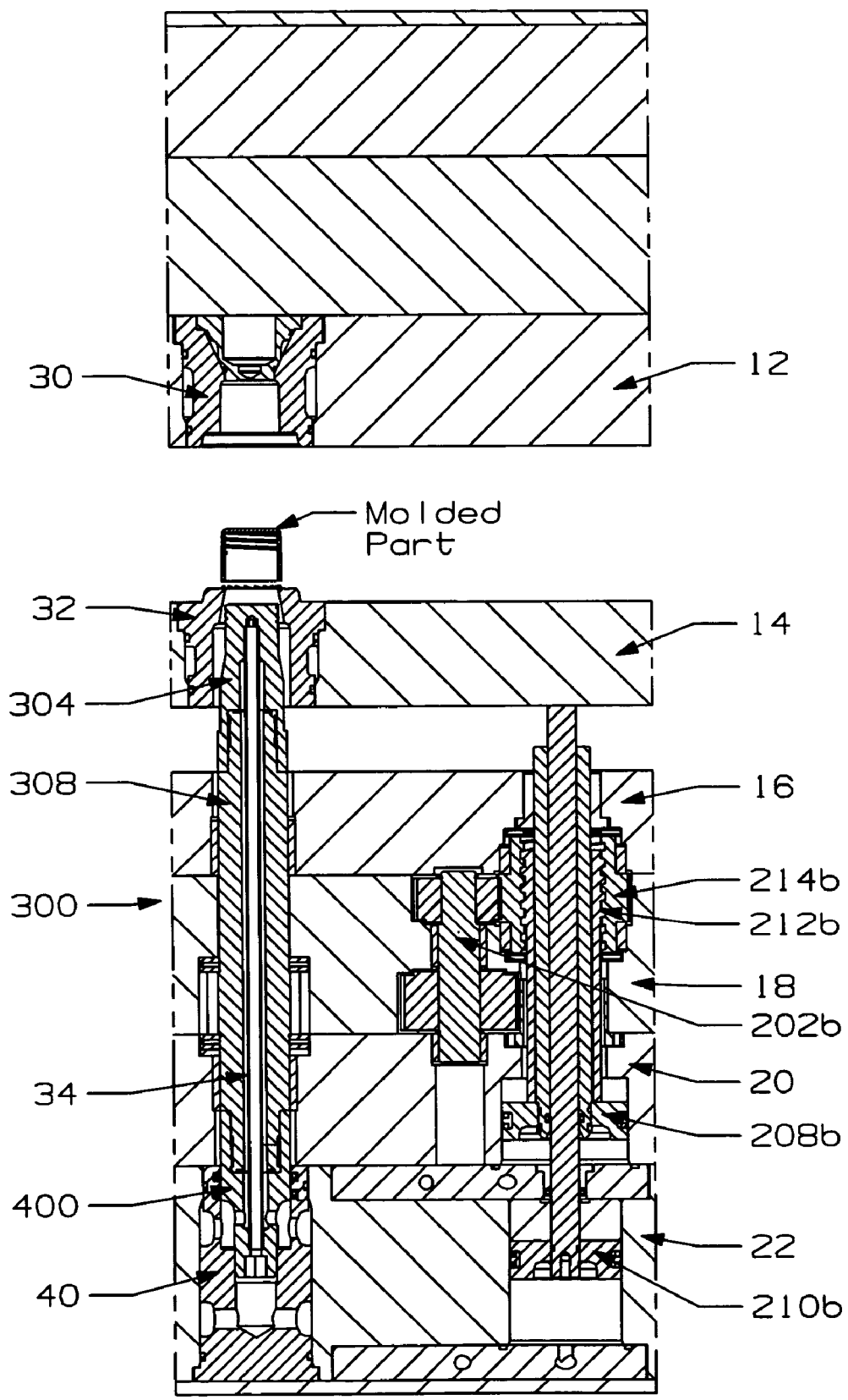
FIG. 14 is a sectional view of the newly designed unscrewing mold in the open position showing the newly designed rotating core 300 after it has been rotated and the molded part has been unscrewed, the timed advance piston 208b has advanced moving the stripper plate 14 forward, and the rapid advance piston 210b has been activated and moved the stripper plate 14 to its full forward stroke.
Figure 15:
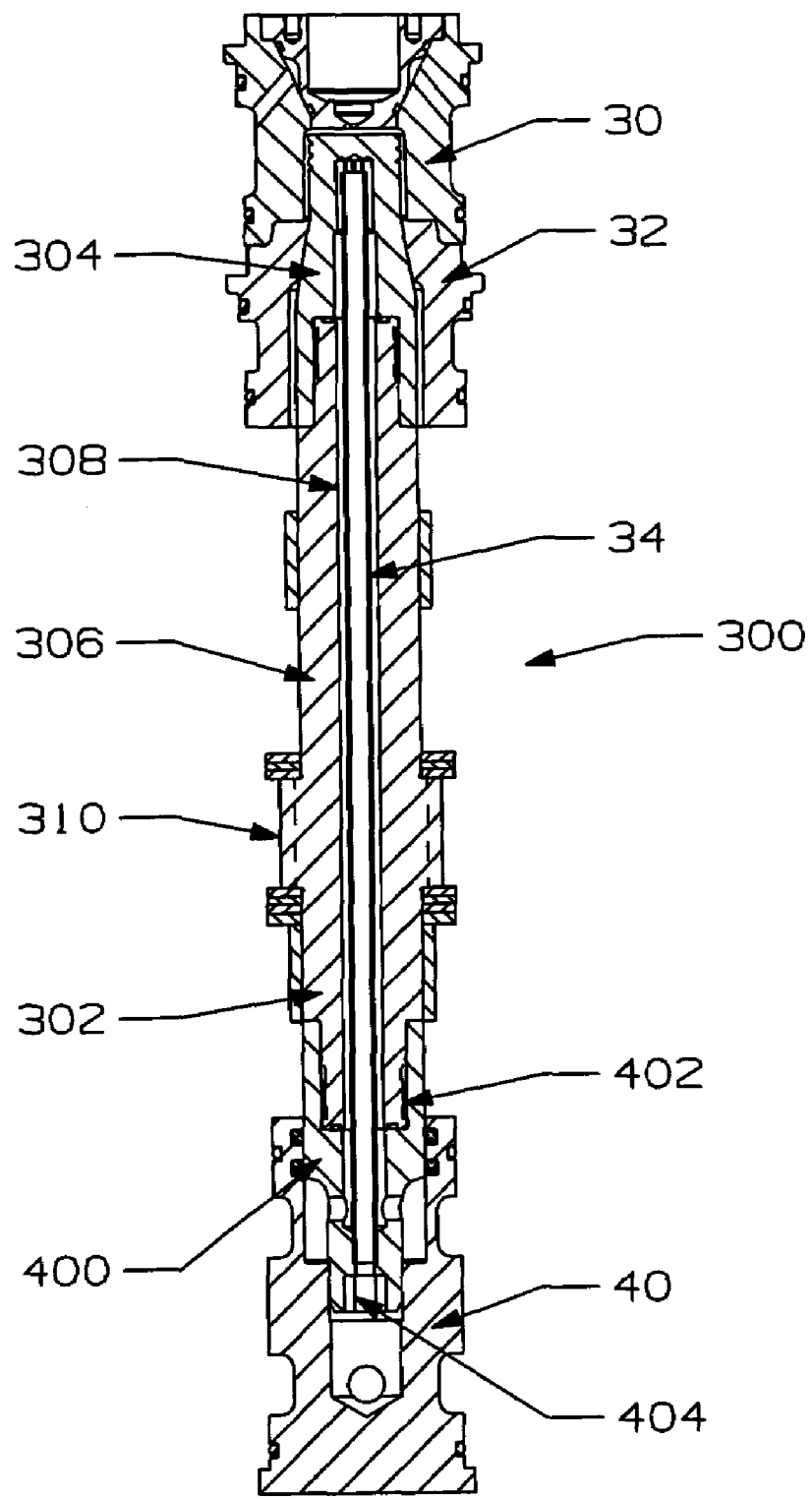
FIG. 15 is a sectional view of the newly designed rotating core 300 constructed as a three-piece assembly depicting the rotating core 300, the top rotating core insert 304 and the water seal insert 400, the water seal bushing 40 and the bubbler tube 34.

Referring now to the drawings, FIGS. 1a–1e depict a typical arrangement of components of an example of a prior art mold system described in the Background of the Invention section above. These drawings include textual indicia of the major parts to more readily familiarize a reader with the operating parts of a prior art molding system. Some of the primary components shown are a hydraulic cylinder 50, a crosshead assembly 60, the racks 70, advance bars 80, an unscrewing mold 10, cavity insert 30, cavity plate 12, stripper plate 14, rack plate 18, bubbler plate 22, the molded part to be manufactured (FIG. 1e), a stripper ring 32, a bearing retainer plate 20, stationary plate 16, an unscrewing core 90, a water seal bushing 40 and a bubbler tube 34. As well as the cam mechanism or assembly, which enables the separation of the stripper plate 14 from the underlying stationary plate 16.

Referring to FIGS. 2–17 in general, we will now discuss the major components of the various embodiments of the invention and its operation.

Operation of the Crosshead Assembly/Bi-Drectional Rack Assembly

Critical to making the Bi-directional rack system 100 work properly is the design of the crosshead mechanism or assembly 120. This system 100 must function in two ways—to push or pull the Bi-directional rack assembly 122 made up of an upper Bi-directional actuating bar 122a, the Bi-directional rack 122b and a lower Bi-directional actuating bar 122c when traveling in either the forward or reverse directions and then—moving the Bi-directional rack 122b to the left or right (engaging with the rotating cores 300 on the left or right—for example, adjacent columns of cores 300b, 300c) at the end of the hydraulic cylinder's 50 stroke.

The hydraulic cylinder coupling 52 and rack actuator bracket 54 are attached to both the upper and lower actuating bar mounting plates 122d. During the forward stroke of the hydraulic cylinder 50, the upper and lower actuating bar mounting plates 122d are prevented from moving forward within the allowable space that is in both the upper and lower crosshead bars 120a.

As the entire crosshead assembly 120 approaches the maximum forward stroke, the upper and lower cam bars 120b come into contact with the forward stops 120c.

As soon as the upper and lower cam bars 120b come into contact with the forward stops 120c, the angled face of the cam bars 120b are forced backward raising the upper forward latch bar 120d and pushing down the lower forward latch bar 120d'. While the upper and lower forward latch bars 120d,120d' are still engaged with the upper and lower actuating bar mounting plates 122d, these plates cannot move forward into the one-half inch clearance (approximate) that is between the actuating bar mounting plates 122d and the upper and lower crosshead bars 120a.

As the entire crosshead bar assembly 120 reaches the last of the forward travel distance, the upper and lower forward latch bars 120d,120d' disengage from the front side of the upper and lower actuating bar mounting plates 122d and allows the two plates to advance and close the gap at the front of these two plates. Now the two upper and lower rear latch bars 120f,120f' will move into the newly formed gap at the rear of the upper and lower actuating bar mounting plates 122d.

The forward movement of the Bi-directional rack 122b stops when the upper and lower crosshead bars 120a reach the forward stops 120c, but the hydraulic cylinder 50 continues its push forward moving the coupling 52, the rack actuator bracket 54, the upper and lower actuating bar mounting plates 122d and the upper and lower actuating bars 122a,122c.

As the actuating bars 122a,122c move forward, their angular ribs or projections 122h move within the angular slots 122g machined onto the Bi-directional rack 122b. Since the Bi-directional rack 122b is prevented from moving forward any further, the angled ribs of the upper and lower actuating bars 122a,122c sliding within the slots of the Bi-directional rack 122b cause the rack 122b and the rack retaining plates 122e to move in a direction perpendicular to the direction of the hydraulic cylinder 50. The Bi-directional rack 122b continues to move sideways until the hydraulic cylinder 50 comes to a stop. At this time, the Bi-directional rack 122b will have disengaged with the rotating cores in column 300b on one side and will have engaged the rotating cores in column 300c on its other side.

As the entire crosshead assembly 120 approaches the maximum reverse stroke, the upper and lower cam bars 120b come into contact with the reverse stops 120e.

As soon as the upper and lower cam bars 120b come into contact with the reverse stops 120e, the angled face of the cam bars 120b are forced forward raising the upper rear latch bar 120f and pushing down the lower rear latch bar 120f'. While the upper and lower front latch bars 120d,120d' are still engaged with the upper and lower actuating bar mounting plates 122*d*, these plates cannot move backwards into the one-half inch clearance (approximate) that is between the actuating bar mounting plates 122*d* and the upper and lower crosshead bars 120*a*.

As the entire crosshead bar assembly 120 reaches the last of the reverse travel distance, the upper and lower rear latch bars 120*f*,120*f'* disengage from the back side of the upper and lower actuating bar mounting plates 122*d* and allows the two plates to move backwards and close the gap at the rear of these two plates. At the end of the reverse travel, the two upper and lower front latch bars 120*d*,120*d'* will move into the newly formed gap at the front of the upper and lower actuating bar mounting plates 122*d*.

The reverse movement of the Bi-directional rack 122*b* stops when the upper and lower crosshead bars 120*a* reach the reverse stops 120*e*, but the hydraulic cylinder 50 continues to pull backwards moving the coupling 52, the rack actuator bracket 54, the upper and lower actuating bar mounting plates 122*d* and the upper and lower actuating bars 122*a*,122*c*.

As the actuating bars 122*a*,122*c* move backwards, their angular ribs 122*h* move within the slots 122*g* machined onto the Bi-directional rack 122*b*. Since the Bi-directional rack 122*b* is prevented from moving in reverse any further, the angled ribs 122*h* of the upper and lower actuating bars 122*a*,122*c* sliding within the slots 122*g* of the Bi-directional rack 122*b* cause the rack 122*b* and the rack retaining plates 122*e* to move in a direction perpendicular to the direction of the hydraulic cylinder 50. The Bi-directional rack 122*b* continues to move sideways until the hydraulic cylinder 50 comes to a stop. At this time, the Bi-directional rack 122*b* will have disengaged with the rotating cores in column 300*c* on one side and will have engaged the rotating cores in column 300*b* on its other side.

Gear teeth 122*f* are cut on both sides of the rack 122*b* and angular slots 122*g* are cut into both the top and bottom faces. These slots are designed to accept the ribs or projections 122*h* machined on the actuating bars 122*a*,122*c*. So looking at the top of the rack 122*b*, the angular slots on the top and bottom of the rack 122*b* are cut in the same direction. The slots 122*g* in the rack 122*b* are of sufficient length so as to allow movement of the rack 122*b* from one side to the other (approximately ¼") when forward or back motion is applied to the actuating bars 122*a*, 122*c*. Of course, one can optionally modify the above to mirror the ribs 122*h* and slots 122*g* such that the ribs 122*h* are instead machined or located on the rack surfaces and the slots 122*g* are instead machined in the actuating bars 122*a*,122*c*.

The actuating bars 122*a*,122*c* are manufactured out of material that should have good bearing characteristics. As mentioned, the actuating bars 122*a* and 122*c* have complimentary ribs cut on either the top or bottom sides. The ribs or projections 122*h* will be shorter than the slots 122*g* machined into the rack 122*b* so as to allow for the side-to-side movement required. The three remaining sides of these bars 122*a*,122*c* are sized to fit into individual pockets in the mold base that are suitably machined to provide a sliding fit with each actuating bar 122*a*,122*c*. The pockets in the mold base will provide guidance, alignment and support for the Bi-directional rack assembly 122.

With gear teeth 122*f* cut on both sides of the rack 122*b*, every mold design using this Bi-directional rack system 122 will be able to place the columns of rotating cores 300 into the mold with minimum pitch-to-pitch spacing. With the close location-to-location spacing of each rotating core 300, the optimal number of threaded cores/cavities can be placed inside of the mold's footprint. This compression optimizes mold cavitation, molding machine capacity and production while minimizing mold size, production cost and maximizing production output.

Operation of the Timed Advance Device (200)

The following mechanism 200, which allows the controlled advance of a pneumatic piston, was developed for use with the new Bi-directional rack system 100. It is a simplified means to raise the stripper plate 14 of a mold in time with the pitch of the threaded closure as it is being unscrewed from the mold and eliminates the space needed for the external camming mechanism.

To advance the stripper plate 14 while the rack 122*b* is operating in either direction, a method had to be developed that could raise the stripper plate 14 mechanically, allow it to return to its closed position and still be in place to advance the stripper plate 14 at the end of the next molding cycle.

The mechanism 200 that has been developed is comprised of four main component assemblies:
1. Two (2) pinion gear assemblies 202.
2. Two (2) idler gear assemblies 204.
3. Two (2) timed advance assemblies 206, which each include a timed advance piston assembly 208 (see 208*a*, 208*b* in FIG. 10).
4. Two (2) rapid advance piston assemblies 210.

The two pinion gear assemblies 202*a*,202*b* connect to the timed advance assemblies 206*a*, 206*b* and the idler gears 204*a*,204*b*.

The two idler gears 204*a*,204*b* connect the two pinion gear assemblies 202*a*,202*b*.

The idler gears 204*a*,204*b* and pinion gear assemblies 202*a*,202*b* are spaced so that when pinion gear assembly 202*a* is engaged with the Bi-directional rack 122*b* pinion gear assembly 202*b* is not engaged with the Bi-directional rack 122*b*.

During the forward stroke of the Bi-directional rack 122*b*, pinion gear assembly 202*b* is not engaged with the bi-directional rack 122*b* and it turns at idle.

At the end of the forward stroke and as the Bi-directional rack 122*b* moves sideways to its alternate position, it disengages from pinion gear assembly 202*a* and engages pinion gear assembly 202*b*.

During the reverse stroke, pinion gear assembly 202*a* is not engaged with the bi-directional rack 122*b* and it turns at idle.

The timed advance assembly 206*a* is also engaged with the upper gear of pinion gear assembly 202*a*.

While the Bi-directional rack 122*b* is turning pinion gear assembly 202*a* during its forward stroke, the upper gear of this assembly is engaged with the timed advance assembly 206*a* and rotates it. The upper gear of pinion gear assembly 202*a* also rotates idler gear assemblies 204*a*,204*b* which in turn rotate the upper gear of pinion gear assembly 204*b* which rotates the threaded bushing 214*b* and allows the externally threaded core 212*b* to advance within the internally threaded bushing 214*b*.

The advancing of the externally threaded core 212*b* allows the primary pneumatic piston 208*b* to advance forward and push the stripper plate 14 up in time with the unscrewing molded part. At the same time, the upper gear of pinion gear assembly 202*a* rotates the threaded bushing 214*a* in the opposite direction of timed advance assembly 206*b*. This allows the externally threaded core 212*a* to retract within the internally threaded bushing 214*a*.

At the end of the Bi-directional rack's 122*b* forward stroke, the retracted externally threaded core 212*a* is down and in position to control the forward motion of primary pneumatic piston 208*a* during the reverse stroke of the Bi-directional rack 122*b*.

It is the effect of this movement and counter movement that makes the system work.

The following is an example of an operational sequence using the inventive Bi-directional rack mold:

1. The two halves of the mold close and the molding cycle begins.
2. At the end of the first molding sequence the mold begins movement to its open position—primary pneumatic cylinders are activated lifting the stripper plate 0.005–0.010 and relieving the clamp pressure on the tapered core shutoffs.
3. The main crosshead assembly, actuated by the hydraulic cylinder, moves forward pushing against the actuating bar retainer plates.
4. The racks and actuating bars move forward against resistance from the rotating cores and the timed advance devices.
5. The rotating cores on the right side of the rack begin turning in a clockwise direction (CW) and the timed advance devices allow the primary pneumatic pistons to rise in time with the unscrewing threaded closures.
6. As the hydraulic cylinder approaches the end of its' forward stroke the upper and lower cam bars (extended in a forward position) come into contact with the forward stops that are attached to the moldbase.
7. The forward movement of the cams bars is stopped.
8. The main crosshead assembly continues its' forward movement for approximately ½". As this entire assembly moves forward, the cam surfaces of the cam bars lift the upper front latch bar and push down the lower front latch bar disengaging them from the front face of the upper and lower actuating bar retainer plates. When the crosshead assembly has completed its forward movement and comes into contact with the forward stops, the forward motion of the crosshead assembly and the bi-directional racks stop.
9. The rapid advance pistons are cycled to insure final ejection of the molded part.
10. The mold begins to close for the next molding cycle.
11. The hydraulic cylinder continues to push the cylinder coupling, the rack actuator bracket and the upper and lower actuating bar mounting plates while the rest of the crosshead assembly is stopped.
12. The disengagement of the front latch bars from the front of the actuating bar retainer plates allows the upper and lower actuating bar retainer plates and the upper and lower actuating bars attached to them to continue their forward movement into the gap created by the disengagement of the front latch bars.
13. Once the upper and lower actuating bar retainer plates have reached their full forward position, the upper and lower rear latch bars move into place behind the upper and lower actuating bar retainer plates and lock them into their forward position.
14. During the ½" forward movement of the upper and lower actuator bars and by the means of their engagement with the bi-directional racks will cause the bi-directional racks to move in a direction perpendicular to the motion of the cylinder disengaging them from the gears on the right and moving the bi-directional rack to engage the gears on its left.
15. The mold is now closed and the next molding cycle begins again as in step 1.
16. At the end of the next molding sequence the mold once again begins to move to its open position the primary pneumatic cylinders are activated lifting the stripper plate 0.005–0.010 and relieving the clamp pressure on the tapered core shutoffs.
17. The main crosshead, actuated by the hydraulic cylinder, moves in reverse pulling against the actuating bar retainer plates.
18. The racks and actuating bars move in reverse against resistance from the rotating cores and the timed advance devices.
19. The rotating cores on the left side of the rack begin turning in a clockwise direction (CW) and the timed advance devices allow the primary pneumatic pistons to be activated and raise in time with the unscrewing threaded closures.
20. As the hydraulic cylinder approaches the end of its reverse stroke the upper and lower cam bars (extended in a rearward position) come into contact with the reverse stops that are attached to the crosshead frame.
21. The reverse movement of the cam bars is stopped.
22. The main crosshead assembly continues its reverse movement for approximately ½". As the entire assembly moves in reverse, the cam surfaces of the cam bars lift the upper rear latch bar and push down the lower rear latch bar disengaging them from the rear face of the upper and lower actuating bar retainer plates.
23. When the crosshead assembly has completed its reverse movement and comes into contact with the reverse stops, the reverse motion of the crosshead assembly and the bi-directional racks stops.
24. The rapid advance pistons are cycled to insure final ejection of the molded part.
25. The mold begins to close for the next molding cycle.
26. The hydraulic cylinder continues to pull the cylinder coupling, the rack actuator bracket and the upper and lower actuating bar mounting plates while the rest of the crosshead assembly is stopped.
27. The disengagement of the rear latch bars from the rear of the actuating bar retainer plates allows the upper and lower actuating bar retainer plates and the upper and lower actuating bars attached to them to continue their reverse movement into the gap created by the disengagement of the rear latch bars.
28. Once the upper and lower actuating bar retainer plates have reached their full reverse position, the upper and lower front latch bars move into place in front of the upper and lower actuating bar retainer plates and locks them in their reverse position.
29. During the ½" reverse movement of the upper and lower actuator bars and by the means of their engagement with the bi-directional racks will cause the bi-directional racks to move in a direction perpendicular to the motion of the cylinder disengaging them from the gears on the left and moving the bi-directional rack to engage the gears on its' right.
30. The mold is now closed and the next molding cycle begins again as in step 1.

Figure 16:
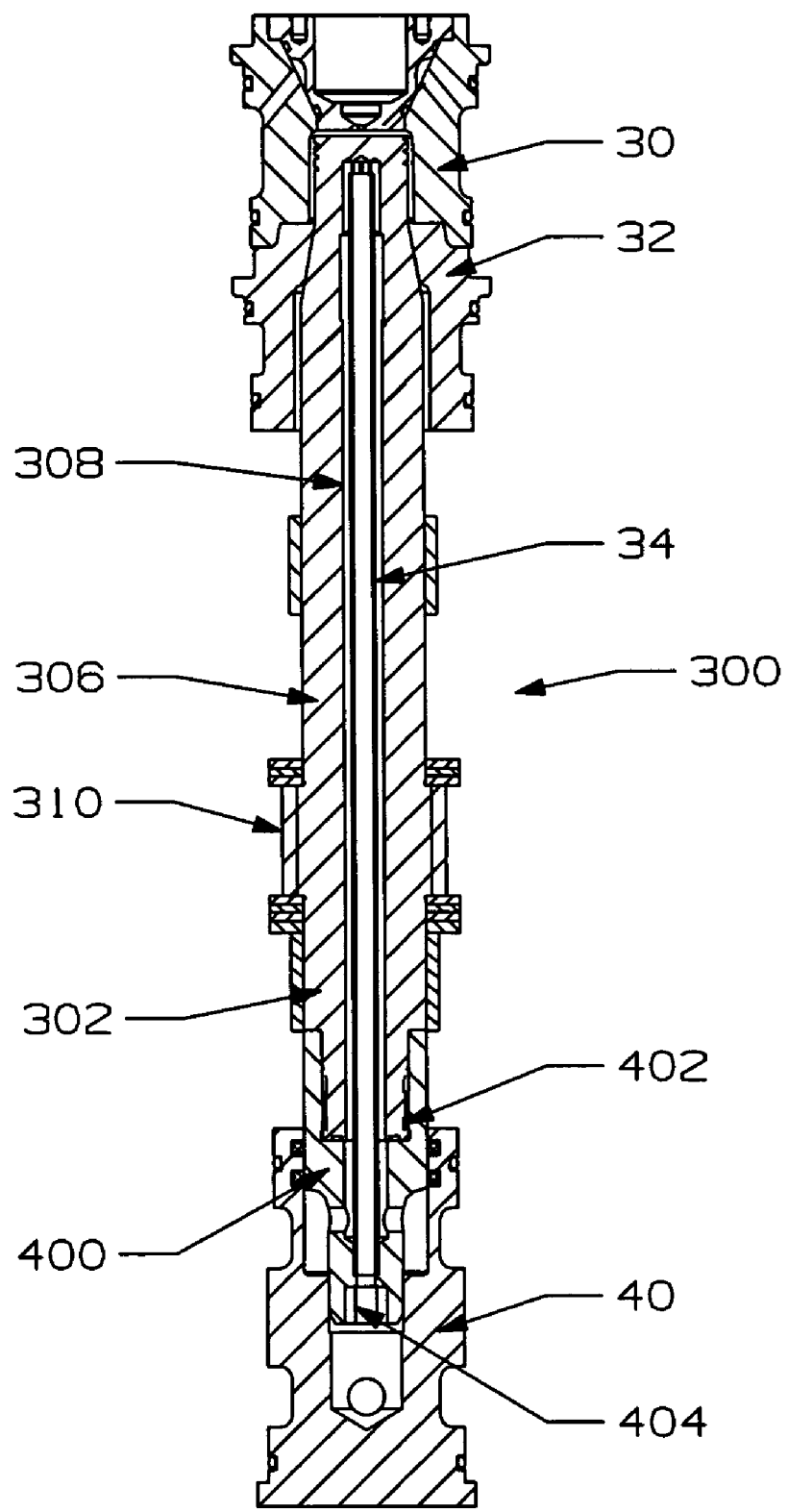
FIG. 16 is a sectional view of a rotating core 300 constructed as a two-piece assembly depicting the rotating core 300 and the water seal insert 400, the water seal bushing 40 and the bubbler tube 34, and it in this assembly, the area of the rotating core that normally has the top rotating core insert is constructed as a one-piece rotating core unit.
Figure 17:
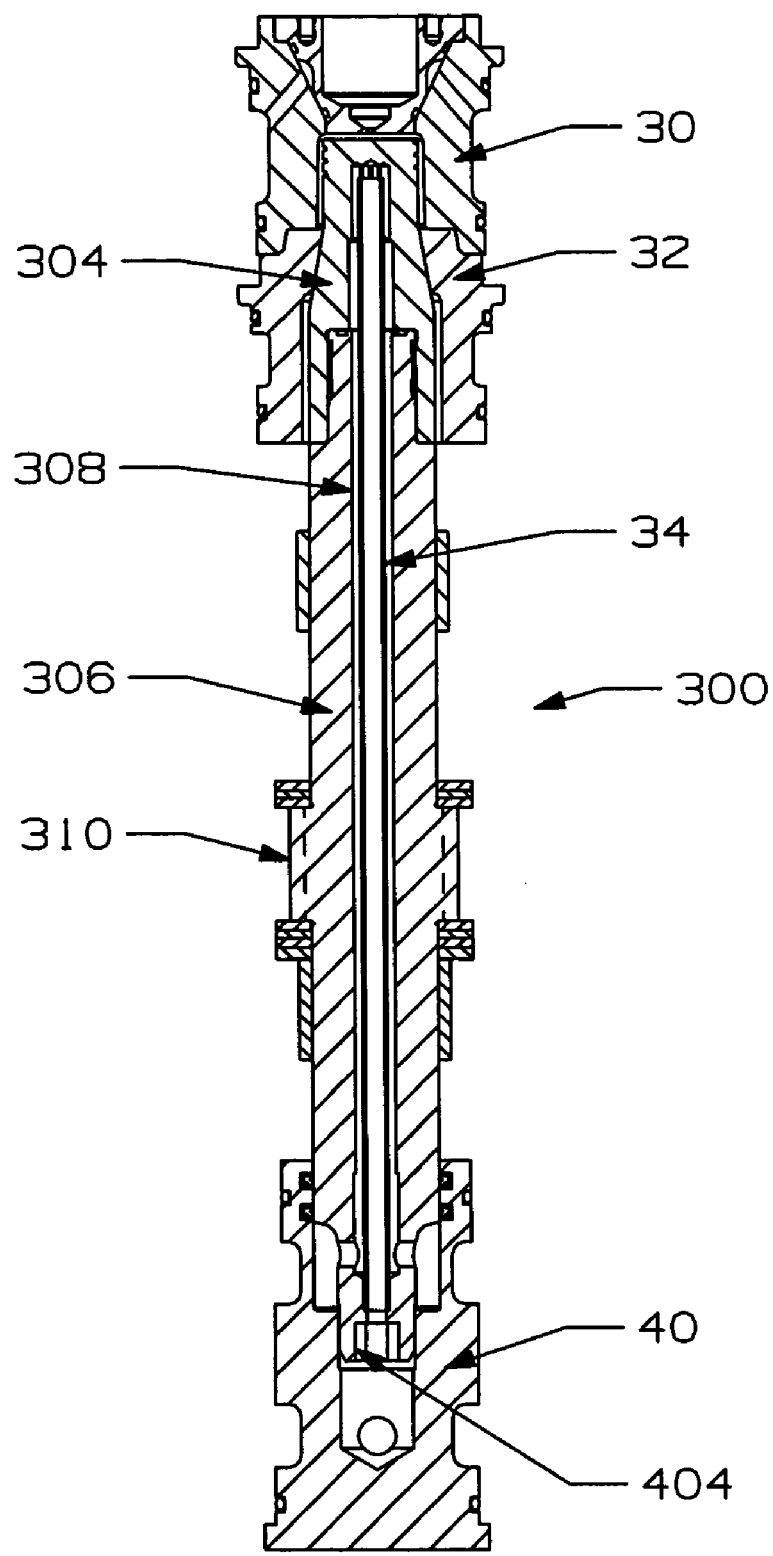
FIG. 17 is a sectional view of a rotating core 300 constructed as a two-piece assembly depicting the rotating core 300 and the top rotating core insert 304, the water seal bushing 40 and the bubbler tube 34 where in this assembly, the area of the rotating core that normally has a water seal insert is constructed as a one-piece rotating core unit.

Referring to FIG. 16, one embodiment of the invention includes a novel multi-portion rotatable core 300 for use in an apparatus for making plastic articles by a plastic injection molding process, the rotatable core comprising:

a lower stock portion 302 and a top core portion 304;

the rotatable core 300 having a longitudinal hollow passageway 308 extending generally from a lower end of the lower stock portion 302 to an upper end of the top core portion 304 for the passage of cooling fluid (source or fluid itself is not shown in the drawings) through a bubbler sleeve 34 inside said hollow passageway 308;

the lower end of the lower stock portion 302 further comprising a replaceable stock water-seal insert portion 400 (described as another novel feature below) at its lower end; and the top core portion 304 further comprising gear means 310 at an intermediate location on its outside surface for engaging a geared rack 122*b*, which causes the rotation of the rotatable core 300.

In another embodiment of the novel rotatable core 300 (depicted conceptually in FIG. 15) for use in an apparatus for making plastic articles by a plastic injection molding process, the rotatable core comprising:

a lower stock portion 302, an intermediate stock portion 306 and a top core portion 304;

the rotatable core 300 having a longitudinal hollow passageway 308 extending generally from a lower end of the lower stock portion 302, through the intermediate stock portion 306 to an upper end of the top core portion 304 for the passage of cooling fluid through a bubbler sleeve 34 inside said hollow passageway 308;

the lower end of the lower stock portion 302 further comprising a replaceable stock water-seal insert portion 400 at its lower end;

the intermediate stock portion 306 further comprising gear means 310 at an intermediate location on its outside surface for engaging a geared rack 122*b* which causes the rotation of the rotatable core 300; and the top core portion 304 having means for removing said top core portion 304 from the intermediate stock portion 306 for replacement of said top core portion 304.

Another novel feature presented herein is a core stock water-seal insert portion 400 for a rotatable core 300 used in apparatus for making plastic articles by a plastic injection molding process, the stock water-seal insert portion 400 comprising:

a stock water-seal insert portion 400 having means 402 for attaching to a rotatable core portion 302 for use in an apparatus for making plastic articles in a plastic injection molding process and for separating from said rotatable core portion 302 for replacing said water-seal seal insert portion 400 when desired;

the water-seal insert portion 400 further comprising a longitudinal hollow passageway 308 extending generally from its lower end through its upper end for the passage of cooling fluid through a bubbler sleeve 34 inside said hollow passageway 308; the lower end of the water-seal insert portion 400 having an inlet port 404 adapted to be in fluid communication with a fluid cooling source (again, the fluid and its source is not shown in the drawings for simplicity) and the bubbler sleeve 34.

The means 402 for attaching to and separating from the rotatable core 302 comprises:

a water-seal insert 400 adapted to threadedly engage a lower end of the rotatable core 302.

Some of the benefits of having a mold system with the various inventive features/configuration of components described throughout this specification include:

Three piece rotating core—allows for easy replacement of core top (molding area).

Three piece rotating core—allows for easy replacement of water seal inserts.

Three piece rotating core—becomes a common part in every mold with the same gear diameter.

Three piece rotating core—core tops and water seals can be replaced in mold.

Three piece rotating core—inserts do not require pinning or locking in place—thread is counter to rotation.

Three piece rotating core—bubbler tubes allow for optimum water flow and cooling.

Three piece rotating core—bubbler tubes are centered to rotating core.

Three piece rotating core—bubbler tubes are supported at both the top and the bottom of its length to prevent "sagging."

Three piece rotating core—bubbler tubes can be easily be cleaned or replaced in mold if necessary.

Three piece rotating core—interchangeable core top allows core tops to be built with conformal cooling channels.

Three piece rotating core—interchangeable core top allows for accurate machining of shutoff angles.

Three piece rotating core—interchangeable core top allows for easy replacement of damaged core right in the mold.

Three piece rotating core—interchangeable core top allows for easy replacement of one style core top with another.

Three piece rotating core—interchangeable core top allows for special material selections (BeCu, etc.).

Three piece rotating core—interchangeable core top bubbler insert allows for best possible cooling channel sizing for molded cap.

Three piece rotating core—interchangeable core top bubbler insert being centered allows for uniform cooling.

Three piece rotating core—interchangeable core top bubbler insert eliminates bubbler tube from drifting out of center.

Three piece rotating core—interchangeable water seal allows exact centering of bubbler to core.

Three piece rotating core—interchangeable water seal allows quick replacement or cleaning of bubbler tube if necessary.

Three piece rotating core—interchangeable water seal eliminates the high cost of one-piece rotating core repair cost.

Three piece rotating core—interchangeable water seal insert can be changed in the press Three piece rotating core—interchangeable water seal reduces down time waiting for rotating cores to be repaired.

Three piece rotating core—interchangeable water seal rotates with core.

Quad ring seal bushing—easy replacement of seal rings.

Quad ring seals—rotational travel is only ½ of normal unscrewing molds this extends seal life 100%.

Quad ring seals were meant to only rotate in one direction—bi-directional rack provides single direction rotation.

Quad ring seal insert can be easily repaired or replaced while still in the press.

Face mounted stripper ring—allows access to the three-piece rotating core's core top insert for replacement in the mold.

Face mounted stripper ring—allows for easy replacement in mold.

Face mounted stripper ring—three-piece rotating core allows removal of core top insert and access to the bubbler tube.

Two-piece rotating core (solid top w/replaceable water seal)—cavity spacing is exactly tooth-to-tooth for the number of rack teeth this allows for orientation of thread.

Bi-directional rack system—allows maximization of cavitation.

Bi-directional rack system—allows mold to close as soon as parts clear mold face.

Bi-directional rack system—allows rotation of cores in one direction only.

Bi-directional rack system—does not have to travel back to home position.

Bi-directional rack system—doubles the life of all bearings and traveling components.
Bi-directional rack system—eliminates the need for an external cam riser.
Bi-directional rack system—increases mold output.
Bi-directional rack system—minimizes mold size.
Bi-directional rack system—reduces the mold maintenance cycles by 50%.
Bi-directional rack system—reduces the molding cycle time by eliminating the time required to return the racks to the home position.
Mold design features—100% up-cavitation during production because of easy replaceability.
Mold design features—50% fewer maintenance cycles.
Mold design features—cavity core stacks are available in a variety of standard diameters to accommodate a wide variety of cap designs and diameters.
Mold design features—compact cavity density.
Mold design features—even if mold closes with the stripper plate in the forward position, no components can be damaged.
Mold design features—faster repair.
Mold design features—fastest cycles possible.
Mold design features—higher cavitation can be purchased for less money.
Mold design features—lower cost to change from one cap style to another.
Mold design features—lower maintenance.
Mold design features—rapid changeover of components—one style to another
Mold design features—repair in press capability
Mold design features—virtually the smallest possible mold size for an unscrewing mold
Pre-engineered cavity/core stacks—individual cavity/core interlock for optimum alignment
Crosshead assembly—actuating bar assemblies are mechanically locked during forward or reverse motion
Crosshead assembly—adjustable forward stops and movable switches can reduce rotation from many turns to a fraction of a turn.
Crosshead assembly—allows rack to move right or left after rack movement has stopped
Crosshead assembly—allows right hand core rotation to be reversed by simply turning bi-directional rack assembly upside down.
Crosshead assembly—effective cylinder seal life is doubled.
Crosshead assembly—geared stabilizers maintain consistent movement forward and back
Crosshead assembly—hydraulic cylinder unscrews caps while traveling in either direction
Crosshead assembly—mechanical movement of crosshead assembly assures positive movement of rack from right to left and from left to right
Timed advance piston assembly—actuation of the primary pneumatic piston at the end of rack travel pushes the stripper plate 0.005–0.010 of an inch off of the taper core shutoffs
Timed advance piston assembly—actuation of the rapid advance piston "shakes" the molded part off of the stripper rings
Timed advance piston assembly—allows pneumatic piston to advance stripper plate in time with unscrewing core thread
Timed advance piston assembly—easily timed for shortened stroke applications
Timed advance piston assembly—need for the external camming action is eliminated
Timed advance piston assembly—rapid advance piston eliminates the unnecessary rack travel required by the external rack system for "shaking" off of the molded part
Timed advance piston assembly—single unit assemblies can be used in conventional unscrewing molds to eliminate the external cams.
Timed advance piston assembly—the rapid advance piston accommodates ejection of tall parts
Timed advance piston assembly—working together as a set they allow for the advance/reset positioning of the pneumatic cylinder It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A method for making plastic articles by a plastic injection molding process, the method comprising:
    providing means for manufacturing the plastic articles wherein articles are manufactured while a crosshead assembly and a plurality of rack assemblies move in a forward direction and articles are manufactured while said crosshead assembly and plurality of rack assemblies move in a reverse direction,
    wherein the means for manufacturing the plastic articles includes rotatable cores that rotate in the same direction regardless of the movement of the crosshead assembly and plurality of rack assemblies in the forward or reverse direction,
    wherein the rotatable cores are arranged in an array of adjacent columns, and
    wherein the plurality of rack assemblies are bi-directional rack assemblies adapted to cause the rotation of respective adjacent rotatable cores, with one rack assembly located on the outside of each of the outermost columns of rotatable cores and the remaining rack assemblies are each located in between a number of adjacent columns of rotatable cores.

2. The method according to claim 1, wherein after a molding sequence is complete and the molded plastic articles are to be unscrewed,
    means for relieving a clamping pressure on a tapered shutoff surface of the rotatable cores is activated,
    wherein a stripper plate is pushed away from a stationary plate in time with a thread pitch of the threaded articles as they are being unscrewed from a threaded portion of the cores.

3. The method according to claim 2, wherein the stripper plate is quickly raised at an accelerated speed to separate and/or eject any molded articles that may want to stick to the stripper plate using pneumatic pistons,
    wherein said pneumatic pistons are activated when the unscrewing of the threaded articles is complete.

4. The method according to claim 3, wherein the stripper plate is pushed away about 0.005 to 0.010 inches from the stationary plate before the bi-directional racks begin to move the rotatable cores.

5. The method according to claim 1, wherein after the molding sequence is complete and the plurality of rack assemblies have completed its motion in the respective forward or reverse direction, actuating bars which were moving in conjunction with the plurality of rack assemblies continue to move a sufficient distance so as to cause the plurality of rack assemblies to disengage from the respective rotatable cores to which each rack assembly was engaged during the completed motion and to engage the respective rotatable cores in the adjacent column of rotatable cores, except in the case of the outermost rack assemblies, for the start of a subsequent molding sequence, and wherein the outermost rack assemblies engage only those column of rotatable cores to their respective left or right depending on their placement.

6. The method according to claim 1, wherein each core comprises a lower stock portion and a separable top core portion.

7. The method according to claim 1, wherein each core comprises a lower stock portion, a separable top portion and an intermediate portion.

8. The method according to claim 6, wherein the lower stock portion includes a replaceable stock water-seal insert portion at its lower end.

9. The method according to claim 7, wherein the lower stock portion includes a replaceable stock water-seal insert portion at its lower end.

10. A method for making plastic articles by a plastic injection molding process, the method comprising:

manufacturing the plastic articles while a crosshead assembly and a plurality of rack assemblies move in a forward direction and manufacturing plastic articles while said crosshead assembly and plurality of rack assemblies move in a reverse direction, wherein rotatable cores rotate in the same direction regardless of the movement of the crosshead assembly and plurality of rack assemblies in the forward or reverse direction, wherein the rotatable cores are arranged in an array of adjacent columns, and wherein the plurality of rack assemblies are bi-directional rack assemblies adapted to cause the rotation of respective adjacent rotatable cores, with one rack assembly located on the outside of each of the outermost columns of rotatable cores and the remaining rack assemblies are each located in between remaining adjacent columns of rotatable cores.

11. The method according to claim 10, wherein after a molding sequence is complete and the molded plastic articles are to be unscrewed, means for relieving a clamping pressure on a tapered shutoff surface of the rotatable cores is activated, wherein a stripper plate is pushed away from a stationary plate in time with a thread pitch of the threaded articles as they are being unscrewed from a threaded portion of the cores.

12. The method according to claim 11, wherein the stripper plate is quickly raised at an accelerated speed to separate and/or eject any molded articles that may want to stick to the stripper plate using pneumatic pistons, wherein said pneumatic pistons are activated when the unscrewing of the threaded articles is complete.

13. The method according to claim 12, wherein the stripper plate is pushed away about 0.005 to 0.010 inches from the stationary plate.

14. The method according to claim 10, wherein after the molding sequence is complete and the plurality of rack assemblies have completed its motion in the respective forward or reverse direction, actuating bars which were moving in conjunction with the plurality of rack assemblies continue to move a sufficient distance so as to cause the plurality of rack assemblies to disengage from the respective rotatable cores to which each rack assembly was engaged during the completed motion and to engage the respective rotatable cores in the adjacent column of rotatable cores for the start of a subsequent molding sequence, and wherein the outermost rack assemblies engage only those column of rotatable cores to their respective left or right depending on their placement.

15. The method according to claim 10, wherein each core comprises a lower stock portion and a separable top core portion.

16. The method according to claim 15, wherein the lower stock portion includes a replaceable stock water-seal insert portion at its lower end.

17. The method according to claim 10, wherein each core comprises a lower stock portion, a separable top portion and an intermediate portion.

18. The method according to claim 17, wherein the lower stock portion includes a replaceable stock water-seal insert portion at its lower end.

19. A rotatable core for use in an apparatus for making plastic articles by a plastic injection molding process, the rotatable core comprising:

a lower stock portion and a top core portion;

the rotatable core rotatable in only one direction having a longitudinal hollow passageway extending generally from a lower end of the lower stock portion to an upper end of the top core portion for the passage of cooling fluid through a bubbler sleeve inside said hollow passageway;

the lower end of the lower stock portion further comprising a replaceable stock water-seal insert portion at its lower end; and the top core portion further comprising gear means at an intermediate location on its outside surface for engaging a geared rack, which causes the rotation of the rotatable core, wherein the water-seal insert portion is configured to be replaceable without disassembly of a mold used in the apparatus for making the plastic articles by the plastic injection molding process, and wherein the water-seal insert portion is threadedly attached to the rotating core so as to provide an orientation to counter rotational forces when an unscrewing motion of the rotatable core from the plastic part takes place.

20. A rotatable core for use in an apparatus for making plastic articles by a plastic injection molding process, the rotatable core comprising:

a lower stock portion, an intermediate stock portion and a top core portion;

the rotatable core rotatable in only one direction having a longitudinal hollow passageway extending generally from a lower end of the lower stock portion, through the intermediate stock portion to an upper end of the top core portion for the passage of cooling fluid through a bubbler sleeve inside said hollow passageway;

the lower end of the lower stock portion further comprising a replaceable stock water-seal insert portion at its lower end;

the intermediate stock portion further comprising gear means at an intermediate location on its outside surface for engaging a geared rack which causes the rotation of the rotatable core; and the top core portion having means for removing said top core portion from the intermediate stock portion for replacement of said top core portion, wherein the water-seal insert portion is configured to be replaceable without disassembly of a mold used in the apparatus for making the plastic articles by the plastic injection molding process, and wherein the water-seal insert portion is threadedly attached to the rotating core so as to provide an orientation to counter rotational forces when an unscrewing motion of the rotatable core from the plastic part takes place.

21. A timed advance assembly for relieving clamping pressure on a tapered shutoff surface of rotatable cores in a plastic injection molding process for making threaded articles, the timed advance assembly, in relation to each Bi-directional rack, comprising:

two timed advance assemblies, each including a timed advance pneumatic piston assembly serving as means adapted for pushing a stripper plate away from a stationary plate in time with a thread pitch of the threaded articles as said threaded articles are being unscrewed from a threaded portion of rotatable cores used in the molding process;

means for cooperative engagement of the two timed advance assemblies with first and second pinion gear assemblies and idler gears;

the pinion gear assemblies being engageable to both the timed advance assemblies and the idler gears, the idler gears being engageable with the pinion gear assemblies, the idler gears and pinion gear assemblies being spaced so that when the first pinion gear assembly is engaged with a Bi-directional rack used in the molding process, the second pinion gear assembly is not engageable with the Bi-directional rack, wherein during a forward stroke of the Bi-directional rack, the second pinion gear assembly turns at idle, as the Bi-directional rack moves sideways to an alternate position, it disengages from the first pinion gear assembly and engages the second pinion gear assembly, and during the reverse stroke of the Bi-directional rack, the first pinion gear assembly turns at idle, wherein the first timed advance piston assembly is also engageable with an upper gear of the first pinion gear assembly, wherein while the Bi-directional rack is turning the first pinion gear assembly during its forward stroke, the upper gear of the first pinion gear assembly is engageable with the timed advance assembly and rotates it, wherein a rotatable core which is externally threaded is allowed to advance within an internally threaded bushing, wherein the advancing of the externally threaded rotatable core allows a primary pneumatic piston to advance forward and push the stripper plate up in time with the unscrewing molded part, and at the same time, the idler gears rotate the second pinion gear assembly in the opposite direction, wherein the second pinion gear rotates the second timed advance assembly in the opposite direction to allow the externally threaded rotatable core to retract within the internally threaded bushing, and wherein at the end of the Bi-directional rack's forward stroke, the retracted externally threaded core is down and in position to control a second primary pneumatic piston to advance forward during the reverse stroke of the Bi-directional rack.

22. The timed advance assembly according to claim 21, further comprising:

rapid advance pneumatic piston means separate from the timed advance pneumatic piston assemblies adapted for quickly raising the stripper plate at an accelerated speed to separate and/or eject any molded articles that may want to stick to the stripper plate, wherein said rapid advance pneumatic pistons are adapted to activate when the unscrewing of the threaded articles is complete.

23. The timed advance assembly according to claim 22, wherein each timed advanced piston assembly comprises a hollow piston rod, which is in sliding operative engagement with a corresponding piston of each of the rapid advance piston assemblies, which independently operates inside the hollow piston rod.

24. A Bi-directional rack assembly for use in plastic molding processes for making plastic articles, the assembly comprising:

a crosshead assembly;

a plurality of spaced-apart parallel Bi-directional rack assemblies engaged at one end with the crosshead assembly with retainer means for retaining said one end within the crosshead assembly;

each Bi-directional rack assembly comprising an elongate longitudinal rack having pitched gear teeth on opposite sides of each rack, said gear teeth adapted for operative engagement with mating gear teeth on adjacent columns of spaced-apart rotatable cores when said rack is used in operative engagement with a mold;

an upper actuating bar and a lower actuating bar in cooperative horizontal side-to-side engagement with respective upper and bottom sides of each rack; and means for retaining said actuating bars in the crosshead assembly and in cooperative alignment with the rack.

25. The assembly according to claim 24, wherein the rack and actuating bars are cooperatively engaged such that the rack has a plurality of spaced-apart parallel slots on each of its upper and bottom surfaces and each actuating bar has a plurality of spaced-apart projections adapted for sliding operative engagement within each corresponding slot on the rack.

26. The assembly according to claim 24, wherein the rack and actuating bars are cooperatively engaged such that the rack has a plurality of spaced-apart projections on each of its upper and bottom surfaces, and each actuating bar has a plurality of spaced-apart parallel slots adapted for sliding cooperative engagement with each corresponding projection on the upper and bottom surfaces of the rack.

27. The assembly according to claim 25, wherein the parallel slots are angularly oriented to accommodate and facilitate side-to-side motion in an angular forward and reverse direction of the rack and to cause the sequential engagement of the rack gear teeth with the respective adjacent columns of rotatable cores.

28. The assembly according to claim 26, wherein the parallel slots are angularly oriented to accommodate and facilitate side-to-side motion in an angular forward and reverse direction of the rack and to cause the sequential engagement of the rack gear teeth with the respective adjacent columns of rotatable cores.

29. A Bi-directional rack assembly for use in plastic molding processes for making plastic articles, the assembly comprising:

an elongate longitudinal rack having pitched gear teeth on opposite sides of each rack, said gear teeth adapted for operative engagement with mating gear teeth on adjacent columns of spaced-apart rotatable cores when said assembly is used in combination with other racks assemblies when in operative engagement with a mold;

an upper actuating bar and a lower actuating bar in cooperative horizontal side-to-side engagement with respective upper and bottom sides of the rack.

30. The assembly according to claim 29, wherein the rack and actuating bars are cooperatively engaged such that the rack has a plurality of spaced-apart parallel slots on each of its upper and bottom surfaces and each actuating bar has a plurality of spaced-apart projections adapted for sliding operative engagement within each corresponding slot on the rack.

31. The assembly according to claim 29, wherein the rack and actuating bars are cooperatively engaged such that the rack has a plurality of spaced-apart projections on each of its upper and bottom surfaces, and each actuating bar has a plurality of spaced-apart parallel slots adapted for sliding cooperative engagement with each corresponding projection on the upper and bottom surfaces of the rack.

32. The assembly according to claim 30, wherein the parallel slots are angularly oriented to accommodate and facilitate side-to-side motion in an angular forward and reverse direction of the rack and to cause the sequential engagement of the rack gear teeth with the respective adjacent columns of rotatable cores.

33. The assembly according to claim 31, wherein the parallel slots are angularly oriented to accommodate and facilitate side-to-side motion in an angular forward and reverse direction of the rack and to cause the sequential engagement of the rack gear teeth with the respective adjacent columns of rotatable cores.

34. A core stock water-seal insert portion for a rotatable core used in apparatus for making plastic articles by a plastic injection molding process, the stock water-seal insert portion comprising:

a water-seal insert portion having means for threadedly attaching to a rotatable core portion rotatable in only one direction for use in an apparatus for making plastic articles in a plastic injection molding process and for separating from said rotatable core portion for replacing said water-seal seal insert portion when desired;

the water-seal insert portion further comprising a longitudinal hollow passageway extending generally from its lower end through its upper end for the passage of cooling fluid through a bubbler sleeve inside said hollow passageway; and the lower end of the water-seal insert portion having an inlet port adapted to be in fluid communication with a fluid cooling source and the bubbler sleeve, wherein the water-seal insert portion is configured to be replaceable without disassembly of a mold used in the apparatus for making the plastic articles by the plastic injection molding process, and wherein the water-seal insert portion is threadedly attached to the rotating core so as to provide an orientation to counter rotational forces when an unscrewing motion of the rotatable core from the plastic part takes place.

35. The insert portion according to claim 34, wherein the means for attaching to and separating from the rotatable core portion comprises:

a water-seal bushing adapted to threadedly engage a lower end of the rotatable core.

* * * * *

UNITED STATES PATENT AND TRADEMARK OFFICE
CERTIFICATE OF CORRECTION

PATENT NO. : 7,157,037 B2 Page 1 of 1
APPLICATION NO. : 11/017585
DATED : January 2, 2007
INVENTOR(S) : Gerald Seidelman et al.

It is certified that error appears in the above-identified patent and that said Letters Patent is hereby corrected as shown below:

Col. 18, line 46
 replace "part"
 with --article--.

Col. 19, line 9
 replace "part"
 with --article--.

Col. 22, line 25
 replace "part"
 with --article--.

Signed and Sealed this

Sixth Day of March, 2007

JON W. DUDAS
*Director of the United States Patent and Trademark Office*